United States Patent
Callari et al.

(10) Patent No.: US 10,893,107 B1
(45) Date of Patent: Jan. 12, 2021

(54) TECHNIQUES FOR MANAGING PROCESSING RESOURCES

(71) Applicant: Amazon Technologies, Inc., Seattle, WA (US)

(72) Inventors: Francesco Giuseppe Callari, Seattle, WA (US); Jean-Guillaume Dominique Durand, Seattle, WA (US); Pradeep Krishna Krishna Yarlagadda, Issaquah, WA (US); Tatiana Glozman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/522,570

(22) Filed: Jul. 25, 2019

(51) Int. Cl.
| | | |
|---|---|---|
| *G06F 13/00* | (2006.01) | |
| *H04L 29/08* | (2006.01) | |
| *G06K 9/62* | (2006.01) | |
| *G06F 8/658* | (2018.01) | |
| *G06N 20/00* | (2019.01) | |
| *B64C 39/02* | (2006.01) | |

(52) U.S. Cl.
CPC ............ *H04L 67/125* (2013.01); *G06F 8/658* (2018.02); *G06K 9/6231* (2013.01); *G06K 9/6256* (2013.01); *G06N 20/00* (2019.01); *H04L 67/34* (2013.01); *B64C 39/024* (2013.01)

(58) Field of Classification Search
CPC ..... H04L 67/125; H04L 67/34; G06K 9/6256; G06K 9/6231; G06N 20/00; G64C 39/024; B64C 39/024; G06F 8/658

USPC .... 709/201, 224, 223; 701/11, 450, 451, 27, 701/40, 77, 98, 106, 481; 703/8; 706/44, 706/1, 2, 12, 14, 15, 45, 46

See application file for complete search history.

(56) References Cited

U.S. PATENT DOCUMENTS

| | | | |
|---|---|---|---|
| 9,958,864 B2 * | 5/2018 | Kentley-Klay | G01S 17/87 |
| 2017/0123421 A1 * | 5/2017 | Kentley | B60W 30/00 |
| 2018/0356821 A1 * | 12/2018 | Kentley-Klay | G01S 17/87 |
| 2019/0107846 A1 * | 4/2019 | Roy | G08G 5/0008 |
| 2019/0155284 A1 * | 5/2019 | Zavesky | G05D 1/0088 |
| 2020/0086862 A1 * | 3/2020 | Cui | B60W 50/14 |

\* cited by examiner

*Primary Examiner* — Kenneth R Coulter
(74) *Attorney, Agent, or Firm* — Kilpatrick Townsend & Stockton LLP

(57) ABSTRACT

Systems and methods are provided herein for managing a set of autonomous vehicles (AVs) configured to perform delivery tasks and computing tasks. Computing tasks can be performed such as training a model and/or calculating an incremental update for the model. As additional training data is obtained, a subset of AVs may be managed as a distributed computing cluster and assigned a computing task such as training or calculating an incremental update for the model or any suitable computing task. Corresponding data computed by the subset of AVs of the cluster (e.g., the retrained model, updated model parameters corresponding to the updated model, etc.) may be received and stored or transmitted (e.g., the computing task requestor, to the AVs, etc.) for subsequent use (e.g., for subsequent delivery tasks).

19 Claims, 9 Drawing Sheets

TECHNIQUES FOR MANAGING PROCESSING RESOURCES

BACKGROUND

Network-based resources, such as electronic marketplaces, are available to users to purchase items (e.g., goods and/or services). Typically, a user (e.g., a customer) may operate a computing device to access a network-based resource to procure an item. The item may be delivered using one available delivery method. One delivery option may be to have the item delivered to a designated delivery location by an unmanned aerial vehicle (UAV). Once the item is loaded on the UAV at a fulfillment center (or other suitable location), the UAV may be configured to navigate to a particular area (e.g., relatively near the delivery location) land, deliver the item, and return to its starting location.

In the context of a UAV delivery fleet, UAVs are designed with powerful computers to run machine-learning model(s) while performing their delivery tasks. After each task is completed, data collected during the delivery task can be off-loaded from the UAV and utilized by a management system to update and/or retrain the machine-learning model (s). However, updating and/or retraining machine-learning model(s) can be expensive in terms of computing power, network loads, and time. The extensive resources needed to perform these operations can create an environment in which the machine-learning model(s) are out-of-date, which in turn can lead to inaccuracy in the output provided. As delivery fleets are expanded, the amount of data collected by the fleet is ever increasing, making it unlikely that training and/or updating times will decrease.

BRIEF DESCRIPTION OF THE DRAWINGS

Various embodiments in accordance with the present disclosure will be described with reference to the drawings, in which.

DETAILED DESCRIPTION

Figure 1:
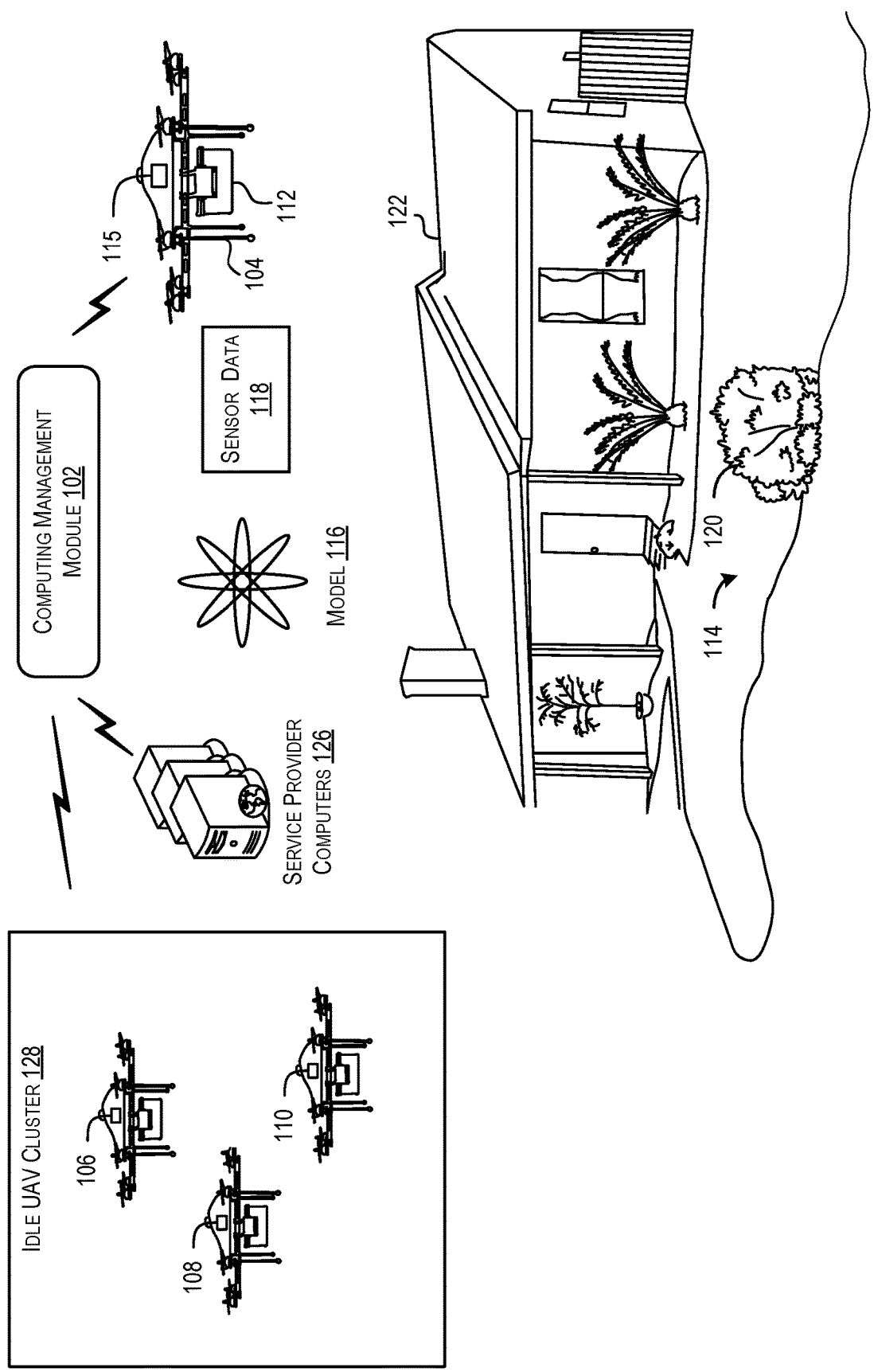
FIG. 1 illustrates an example operational environment for performing a computing task utilizing one or more idle UAVs and a computing management module, in accordance with at least one embodiment.

Techniques described herein are directed utilizing the computing resources of one or more autonomous vehicles to train and/or update one or more machine-learning models. The term "autonomous vehicle" may include any suitable vehicle such a car, a boat, a plane, a drone or any suitable vehicle of land, air, or water, that can perform tasks autonomously (e.g., without human guidance to perform the tasks). Although the examples herein may utilize the term unmanned aerial vehicle (UAV), it should be appreciated that in any of these examples any suitable autonomous vehicle may be utilized. An "autonomous vehicle," including UAVs, may include a computer system, such as a set of processors and memories that store data (e.g., one or more machine-learning models, sensor data, operational data, task assignment data, etc.) and which are configured to perform various tasks including, but not limited to, delivery tasks, data collection tasks, and computing tasks. Some computing tasks can include supporting the training, retraining, and/or incremental updating of one or more machine-learning models. A data collection task may refer to any suitable task that includes collecting data (e.g., sensor data, operational data such as speed, heading, altitude, and the like), A delivery task is intended to refer to any suitable task related to conveying an item from one location to another. In some embodiments, a data collection task may be performed as part of another task (e.g., as part of a delivery task). Any suitable example herein that utilizes a delivery task may be similarly applied to use cases in which a data collection task is utilized in lieu of or in addition to the delivery task. The term "machine-learning model" may also be referred to as "a model" for brevity, is intended to refer to any suitable mathematical representation of a real-world process. A machine-learning model may be generated by applying a machine-learning algorithm to sample data (also referred to as "training data" or "a training data set"). A model may be trained using any suitable machine-learning technique such as supervised, unsupervised, semi-supervised, and/or reinforcement machine-learning techniques. For example, these models may be trained using any suitable machine-learning algorithm such as linear regression, logistic regression, k-means algorithms, k-nearest neighbor algorithms, clustering algorithms, neural networks, Naive Bayes algorithms, classification and regression trees, decision trees, random forest algorithms, Apriori algorithms, to name a few.

In at least one embodiment, a user may navigate to a website of an electronic marketplace. In some examples, the electronic marketplace may be managed by one or more service provider computers (e.g., servers) that host electronic content in the form of an electronic catalog. Users of the electronic marketplace may access the electronic catalog to view, review, discuss, order, and/or purchase items (e.g., physical items that may be stored in a warehouse or other location or electronic items that may be stored on a server and served to electronic devices) from the electronic marketplace. In some examples, order information identifying one or more items to be delivered to the user (e.g., a gallon of milk, a book, an article of clothing, etc.) may be obtained. The order information may indicate that the item(s) are to be delivered by UAV. The UAV may be associated with a set of attributes (e.g., an identifier, system attributes corresponding to propulsion and landing systems, camera system specifications corresponding to one or more cameras attached to the UAV, etc.). In some examples, a UAV may be assigned to the delivery (e.g., a next available UAV, a UAV that services a particular region, etc.). In some embodiments, the user may be provided with an image that may be printed or otherwise utilized to provide a marker that is recognizable to the UAV as being associated with the delivery. In other examples, the service provider may provide (e.g., ship) a marker (e.g., a cloth, sheet of plastic, etc.) to the user for item delivery. In still further examples, an electronic display device (e.g., a light-emitting diode (LED) screen, a liquid crystal display (LCD), a projector, or the like) may be utilized to depict the marker for delivery purposes.

In at least one embodiment, the user may place the marker (or otherwise display the marker) at a location (e.g., the user's front yard, back yard, rooftop, driveway, shipment area, etc.) in order to mark the location at which the delivery should take place. The UAV may be configured with a number of sensors (e.g., cameras, radar devices, light detection and ranging (LIDAR) devices, sonar devices, GPS devices, etc.). During performance of the delivery task, or at any suitable time, the UAV may perform one or more data collection tasks such as collecting sensor data from any suitable combination of one or more sensors of the UAV. It should be appreciated that the one or more data collection tasks can additionally, or alternatively, involve collecting other types of data such as operational data indicating operational parameters (e.g., speed, heading, altitude, etc.), temperature and/or environmental parameters (e.g., humidity, weather conditions, etc.), or any suitable parameter related to the operation of the UAV. One or more data collection tasks may be performed utilizing any suitable component of the UAV at any suitable time, not necessarily during a delivery task.

In some embodiments, the UAV may store one or more previously trained machine-learning model(s). The machine-learning model(s) stored at the UAV may be utilized for any suitable purpose. As a non-limiting example only, a UAV may store a machine-learning model that is trained with supervised techniques and historical sensor data (e.g., camera images) to identify objects near a landing sight and/or object near the UAV during performance of a delivery task. Any suitable sensor data collected during performance of a task (e.g., a data collection task, a delivery task) may be utilized as additional training data with which the model(s) may be updated and/or retrained.

Regardless of the type, number, or purpose of models stored in memory of the UAV, updating and/or retraining these models can be extensive with respect to computing power, network loads, and time. Techniques discussed herein are directed to utilizing one or more idle UAVs as computing nodes of a computing cluster to update and/or retrain the model(s) to increase the computing resources available to perform such computations.

In some embodiments, a computing management module may be utilized to facilitate model updates and/or retraining. The computing management module may operate as part of a larger management system configured to manage a fleet of UAVs (e.g., at least two UAVs) and/or the computing management module may operate as part of a separate service or system. The computing management module may be configured to obtain new data (e.g., sensor data) from UAVs that have recently performed a task (e.g., a data collection task, a delivery task, a retrieval task, etc.). In some embodiments, computing management module may facilitate one or more incremental updates to the model(s) and/or the computing management module may facilitate a full retraining of the model(s). For simplicity, the examples herein may be provided with respect to updating and/or retraining a single model, but it should be understood that these techniques may be applied to any suitable number of models. The particular number of models used may vary based on the context in which the models are used.

As used herein, calculating an incremental update (also referred to as "an update") to a machine-learning model may utilized a different process from a process used to train (or retrain) a model. For example, a training (and/or retraining) process for a model may utilize all examples of a training data set, perhaps at the same time, and perhaps irrespective of their temporal order. In contrast, calculating incremental updates may utilize already known information of a previous model (e.g., a compact representation of previously observed signals, the previous model parameters, etc.) and one or more instances of new training data only. Incremental learning techniques utilized to calculate such updates may take into account the temporal structure of the instances of new training data. As a result, incrementally updated models can become inaccurate due to changes in the data distribution over time (referred to as "concept drift"). Incremental updates can be beneficial from a computing standpoint, as these updates can enable rapid adaptation of the model based on the new training data. The computation burden of computing an incremental update may be significantly less extensive than the computation burden of training/retraining a model. It may be the case that a model trained on the previous training data set and the instances of new training data may be more accurate in its predictions and/or output than a model that has been trained on the previous training data set alone, and then incrementally updated one or more times.

The computing management module may manage computing tasks for one or more nodes of a computing cluster utilizing any suitable distributed computing management techniques. In some embodiments, the nodes of the computing cluster may include any suitable number of UAVs. By way of example, the computing management module may identify one or more UAVs of the fleet as being in an idle state. Upon identifying the idle UAVs, the computing management module may add the idle UAVs to the computing cluster and assign these idle UAVs various computing tasks (e.g., calculate incremental update, train or retrain a model, etc.). It may be the case that UAVs fluctuate between an idle state (e.g., the UAV has no currently assigned delivery task, retrieval task, data collection task, computing task, or the like) and an active state (e.g., the UAV has a current task assignment). The computing management module may monitor these states and add UAVs to the computing cluster that transition to an idle state and remove UAVs that transition to an active state. As used herein, a "task" is intended to refer to any suitable task (e.g., delivery tasks, retrieval tasks, data collection tasks, etc.) associated with UAV that is not performed as part of a computing cluster. Whereas, the term "computing task" is intended to refer to tasks performed by a UAV as part of the computing cluster discussed herein.

According to some embodiments, upon determining new training data (e.g., sensor data) is available (e.g., from a UAV that has recently performed a data collection task perhaps as part of a delivery task), the computing management module may generate and maintain (e.g., within a queue or other suitable storage contained) a computing task associated with an incremental update to be performed using that sensor data. The computing management module may assign one or more nodes (e.g., idle UAVs) of the computing cluster the computing task of calculating an incremental update to a model. The computing management module may transmit previously known information about the model and the new sensor data to the nodes to be utilized to calculate the incremental update. In some embodiments, the computing management module may group one or more instances of new sensor data (e.g., from one or more UAVs) such that the group of sensor data instances are utilized to calculate the incremental update to the model. In some embodiments, the calculated incremental update may include new model parameters for the model. In some embodiments, the computing management module may update a previously stored model with the model parameters calculated for the incremental update. The computing management module, in some embodiments, may store a last fully-trained model and a most current incrementally updated model. Once updated, the computing management module may deploy the newly updated model to any suitable number of UAVs. In some embodiments, the computing management module may deploy the newly updated model to currently idle UAVs. The computing management module may monitor for UAVs that transition from an active state to an idle state and deploy the updated model when the UAVs is not currently active.

In some embodiments, new instances of training data (e.g., sensor data) may be collected and added to a previously stored training data set. The computing management module may determine the model is to be retrained according to any suitable predetermined schedule (every Monday) and/or frequency (e.g., every 24 hours). The computing management module may utilize the computing cluster of idle UAVs to retrain the model using the aggregate training data set including the new instances of training data as well as the previously stored training data set. The idle UAVs may receive the aggregate training data set from the computing management module or from any suitable storage location accessible to the UAVs. Once retrained, the model may be stored by the computing management module. In some embodiments, the retrained model may replace a last fully-trained model previously stored by the computing management module. The computing management module may deploy the newly trained model to any suitable number of UAVs. In some embodiments, the computing management module may deploy the newly trained model to currently idle UAVs. The computing management module may monitor for UAVs that transition from an active state to an idle state and deploy the newly trained model when the UAVs is not currently active.

It should be appreciated that the computing management module may utilize similar techniques when a model is to be trained for the first time. In those situations, the computing cluster would train the model utilizing an initial training data set (e.g., a first training data set) received from the computing management module or retrieved from a suitable storage location accessible to the computing cluster nodes (e.g., the idle UAVs).

The techniques disclosed herein provide, at least, an efficient method for utilizing previously unutilized or underutilized computing power of a fleet of UAVs. By utilizing the techniques included herein, computing resources that were once left idle (e.g., idle processors of one or more UAVs of a delivery system) may be utilized to perform valuable computations. Although some of these tasks are described herein as being associated with retraining, and/or incrementally updating a machine-learning model, it should be appreciated that the UAVs may be utilized to perform computing tasks of any suitable nature, even computing tasks that relate to other systems or devices. When the computing power of the UAVs are used for incremental updates to a model, the new training data may be incorporated and disseminated quickly to increase the accuracy of the model(s) used by the UAVs during task performance (e.g., delivery task performance, data collection task performance, etc.). This can result in more accurate determinations related to, for example, obstacle detection, which can lead to more efficient and accurate task performance of the system as a whole. Through utilizing the processing power of idle UAVs as a computing cluster, the number of computing resources may be increased which may result in training models in less time than previously realized using traditional techniques and resources.

FIG. 1 illustrates an example operational environment 100 for performing a computing task utilizing one or more idle UAVs and a computing management module 102, in accordance with at least one embodiment. Although UAVs are utilized in FIG. 1, it should be appreciated that any suitable unmanned autonomous or semi-autonomous vehicle may be similarly utilized in the following examples. In the illustrated environment of FIG. 1, the UAVs, 104, 106, 108, and 110 may be operated by a service provider of an electronic catalog from which items may be procured. In some embodiments, the item 112 may be procured by a user via the electronic catalog hosted by the service provider. While any of UAVs 104-110 may be configured to deliver the item, the UAV 104 may be selected and instructed to deliver the item 112 to location 114. In some embodiments, the location 114 may be identified with a marker (not depicted) indicating a landing sight. The UAV 104 may be deployed to the location 114 while carrying item 112. In the example operational environment 100, the location 114 may be relatively near a dwelling 122 of the customer. However, the embodiments described herein are not limited as such and may similarly apply to other types of locations and/or other associations to the user. The UAV 104 may rely on image data from camera system 115 to detect the location 114. The camera system 115 may include one or more cameras affixed to a suitable portion of the UAV 104.

In some embodiments, the UAV 104 may store any suitable number of machine-learning models that it may utilize to perform a task (e.g., a delivery task, a data collection task, etc.). One example machine-learning model may include a model 116 for identifying objects from image data. The model 116 may be utilized by any of the UAVs 104-110 to identify objects near the UAV (e.g., during landing, during flight, etc.) in order to identify remedial steps to be taken (e.g., selecting a different landing spot, performing evasive maneuvers, etc.). In some embodiments, the model 116 may be previously trained utilizing supervised learning techniques and a historical training data set including images in which objects have previously been identified. This is merely illustrative, the model 116 may be trained utilizing any suitable machine-learning technique including supervised, unsupervised, semi-supervised, and/or reinforced learning techniques to provide any suitable type of data output. The specific number of models and/or designated purpose of such models may vary based at least in part on the context in which the UAVs are utilized.

As the UAV 104 approaches the location 114, or at any suitable time, the UAV 104 may operate camera system 115 to capture sensor data 118 such as still images and/or video(s) of the area near and around 114. Other sensor data such as radar, LIDAR, sonar, GPS, or any suitable data collected by any suitable sensor of the UAV 104 may be collected. The collected sensor data (e.g., the image(s)/video (s)) may be provided as input to the model 116. The model 116 may be configured to provide an output indicating 1) that an object (e.g., shrubbery 120, house 120, etc.) exists within a threshold distance of the location 114 and/or within a threshold distance to the UAV 104. In some embodiments, the UAV may be configured to identify one or more operations to perform when an object is detected by the model. This may include executing a predetermined set of instructions, requesting instructions from one or more services (e.g., a service to identify the type of object, a service to identify one or more remedial actions such as picking a different landing spot, returning to a starting location, and the like).

The computing management module 102 of the UAV 104, an instance of which may operate on each of the UAVs 104-110, may be configured to cause the sensor data 118 to be transmitted to service provider computers 124 at any suitable time. The service provider computers 124 may manage a computing cluster (e.g., the idle UAV cluster 128) including one or more UAVs determined to be in an idle state (e.g., not currently performing any delivery and/or computing tasks, and not currently part of the computing cluster). The service provider computer 124 may be the same or a different system as the one hosting the electronic catalog from which item 112 was procured.

In some embodiments, the computing management module 102 may be configured to transmit the sensor data 118 according to any suitable predetermined time, schedule, frequency, upon occurrence of an event such as task completion, upon request, or at any suitable time. In some embodiments, the service provider computers 126 may be configured to request the sensor data 118 according to any suitable predetermined time, schedule, frequency, upon occurrence of an event such as task completion, by user request, or at any suitable time. The service provider computers 126 may provide one or more interfaces to enable a user to review the sensor data 118. In some embodiments, the interfaces may be configured to allow the user to annotate (e.g., associate the sensor data 118 with labels), request a computing task to be performed utilizing particular information (e.g., the model 116, the sensor data 118, historical sensor data from which objects were previously identified, etc.), delete the sensor data 118, add the sensor data 118 to a historical training data set used to train one or more machine-learning models, etc.

As a non-limiting example, the UAV 104 may transmit the sensor data 118 upon completion of the delivery task associated with delivering the item 112 to location 114. The sensor data 118 may be provided to a user for annotation and/or review. In some embodiments, the user may annotate the data (e.g., indicating, for example, that the images include certain objects, weather conditions, lighting conditions, to name a few examples) and cause the sensor data 118 to be added to a historical training data set. In some examples, the sensor data 118 may not be presented to a user and may just be stored together or separate from the historical training data set.

The service provider computers 126 may be configured to assign the computing cluster (e.g., the idle UAV cluster 128) a computing task utilizing the sensor data 118. In some examples, the computing task may relate to training, retraining, and/or incrementally updating the model 116. By way of example, if training the model 116, the idle UAV cluster 128 may receive a historical training data set (e.g., historical sensor data from past tasks such as delivery tasks, data collection tasks, retrieval tasks, and the like, and/or a predefined training data set) from the service provider computers 126 or from a suitable storage location accessible to the UAVs 106-110. For computing tasks related to retraining the model 116, the idle UAV cluster 128 may receive a historical training data set (e.g., historical sensor data from past tasks and/or a predefined training data set) and the sensor data 118 (e.g., separate or as part of the historical training data set) from the service provider computers 126 or from a suitable storage location accessible to the UAVs 106-110. For computing tasks related to incrementally updating the model 116, the idle UAV cluster 128 may receive the model 116 (as previously trained), a historical training data set (e.g., historical sensor data from past tasks and/or a predefined training data set), and the sensor data 118 (e.g., separate or as part of the historical training data set) from the service provider computers 126 or from a suitable storage location accessible to the UAVs 106-110. The service provider computers 126 may operate as a master node of the computing cluster (the idle UAV cluster 128) or the service provider computers 126 may assign a particular UAV of the cluster to operate as a master node. The master node may perform load balancing, task assignment, monitoring, or any suitable tasks to computing nodes (e.g., individual UAVs of the idle UAV cluster 128) to cause the computing cluster to perform the computing task.

If the cluster was utilized to train or retrain a model, the service provider computers 126 may receive from at least one UAV of the computing cluster a model, model parameters, an indication the computation is complete, a location of the model and/or model parameters at a location accessible to the service provider computer 126, or the like. If the cluster was utilized to update a model, the service provider computers 126 may receive from at least one UAV of the computing cluster updated model parameters, an indication the computation is complete, a location of the updated model parameters at a location accessible to the service provider computer 126, or the like. If not previously stored, the service provider computers 126 may store such information for subsequent use. When storing, the service provider computer 126 may replace a previously stored model (e.g., a last-trained model, a last incrementally updated model, etc.) with the model obtained from the computing cluster. In some embodiments, the service provider computers 126 may deploy (e.g., transmit, distribute, etc.) any suitable combination of the model 116 as updated, model parameters for the model 116, or updated model parameters for the model 116 to any suitable UAV. In some embodiments, the service provider computers 126 may deploy such data to all UAVs of the fleet it manages or a subset of the UAVs of the fleet. For example, the trained/retrained model, model parameters, and/or updated model parameters may be deployed to currently idle UAVs so as not to interrupt the operation of UAVs that are actively performing a tasks (e.g., any suitable task not performed as part of a cluster such as a delivery task, a data collection task, etc.) and/or computing task. In some embodiments, the service provider computers 126 may monitor the state of the UAVs of the fleet and delay the deployment of the data to a UAV until it detects the UAV it in an idle state (or another suitable condition indicating an appropriate time to deploy the data), after which the data may be deployed to the UAV.

Although FIG. 1 depicts a particular example of data (e.g., sensor data) and a particular computing task (e.g., training, retraining, and/or incrementally updating the model 116), it should be appreciated that the idle UAV cluster 128 may be utilized to perform any suitable computing task. For example, the collective computing power of the idle UAV cluster 128 may be utilized to perform any suitable computing task regardless of whether the computing task relates to the UAV fleet operations. That is, a remote device (e.g., a user device, another system, etc.) may request a computing task to be completed by the idle UAV cluster 128 via the service provider computers 126 utilizing an interface provided by the service provider computers 126. In some embodiments, the service provider computers 126 may maintain billing and/or account information associated with the requesting device and may monitor the computing time and/or computing resources utilized to perform the computing request. Upon completion, or at any suitable time (e.g., prior to instructing the idle UAV cluster 128 to perform the computing task), the service provider computer 126 may generate billing data and/or process payment data for utilizing the idle UAV cluster 128 to perform the computing task.

Utilizing the techniques described herein, UAVs may be utilized to perform non-cluster based tasks and/or computing tasks. In some embodiments, the non-cluster-based tasks (e.g., delivery tasks, data collection tasks, retrieval tasks, etc.) may take priority over computing tasks. In some embodiments, rather than wasting the computing resources provided by idle UAVs, these UAVs may be utilized to perform a variety of computations while waiting for another task (e.g., delivery tasks, retrieval tasks, data collection tasks, etc.), which in turn can provide important data updates to improve the system as a whole.

Figure 2:
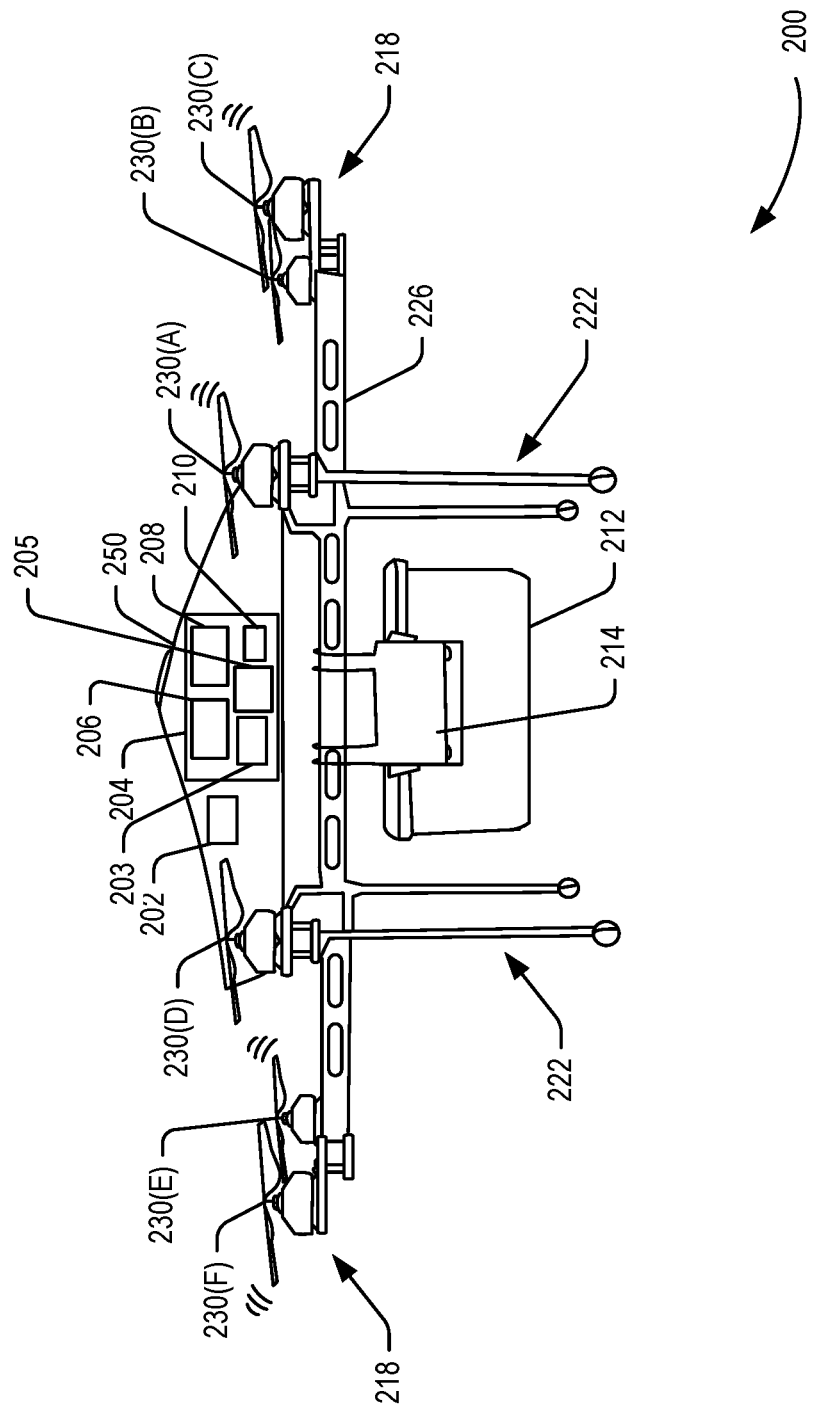
FIG. 2 illustrates an example unmanned aerial vehicle, in accordance with at least one embodiment.

FIG. 2 illustrates an example unmanned aerial vehicle (UAV) 200 (e.g., and example of the UAVs 104-110), in accordance with at least one embodiment. In FIG. 2, an example UAV 200 configured to deliver an item (and/or pickup an item) is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management module 202 and a computing management module 205.

The management module 202 may be configured to mechanically and/or electronically manage and/or control various operations of other components of the UAV 200 (e.g., operations associated with delivery tasks, retrieval tasks, data collection tasks, etc.). For example, the management module 202 may include various sensing, activating, and monitoring mechanisms to manage and control various autonomously or semi-autonomously operations. For instance, the management module 202 may be part of and/or hosted by an onboard computing system 204. The various operations may include managing other components of the UAV 200, such as a camera system 203 and/or other sensor(s) for collecting sensor data, a propulsion system 218 to facilitate flights, a payload holding mechanism 212 to facilitate holding a payload (e.g., a package), and/or a payload releasing mechanism 214 to facilitate release and delivery of the payload. The payload releasing mechanism 214 may also be utilized as a grabbing mechanism or another suitable grabbing mechanism may be utilized for picking up an item. Although not depicted, it should be appreciated that UAV 200 may include any suitable combination of one or more cameras, LIDAR devices, radar devices, sonar devices, and/or GPS devices, all of which may be similarly managed by the management module.

Portions of the management module 202, including mechanical and/or electronic control mechanisms may be housed under the top cover 250 or distributed within other components such as the payload holding mechanism 212 and the payload releasing mechanism 214. In a further example, components remote from the UAV 200 (e.g., computing components of a service provider) may be in communication with the management module 202 to direct some or all of the operations of the management module 202.

In an example, the management module 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), Light Detection and Ranging (LIDAR) and other systems to aid in navigating the UAV 200 and/or detecting objects) (not shown), and/or radio-frequency identification (RFID) capability (not shown).

The UAV 200 may also include a computing management module 205 (e.g., the computing management module 102 of FIG. 1). In some examples, the computing management module 205 may be part of and/or hosted by an onboard computing system 204. The computing management module 205 may include any suitable application programming interfaces for interfacing with computing management modules of other UAVs and/or a computing management module of a remote management system (e.g., a management system of a service provider). The computing management module 205 may be configured to manage any suitable number or type of computing tasks. These computing tasks may be assigned to the UAV from the remote management system utilizing the computing management module 205. The computing management module 205 may be configured to perform any suitable operations for participating in a distributed computing cluster including the UAV 200. In some embodiments, the computing management module 205 may include instructions that configured the UAV 200 to operate as a master node of the computing cluster. When operating as a master node, the computing management module 205 may perform any suitable task scheduling, load balancing, task parallelism, and/or monitoring operations for managing computing tasks of the computing cluster. The computing management module 205 may configure the UAV to operate as a computing node in the distributed computing cluster. When operating as a computing node, the computing management module 205 may receive any suitable data and/or instructions associated with any suitable number or type of calculations (e.g., computing tasks including, but not limited to, computations associated with training, retraining, and/or incrementally updating a machine-learning model.

The UAV 200 may also include the onboard computing system 204. In an example, the onboard computing system 204 may be integrated with the management module 202 and/or the computing management module 205. In another example, the onboard computing system 204 may be separate from but may interface with the management module 202. The onboard computing system 204 may be configured to provide an electronic control of various operations of the UAV 200. In an example, the onboard computing system 204 may also process sensed data by one or more other components of the UAV, such as the camera system 203. In a further example, the onboard computing system 204 may also electronically control components of the payload holding mechanism 212 and/or the payload releasing mechanism 214. In another example, the onboard computing system 204 may also electronically control components of the UAV 200 such as a plurality of propulsion devices, a few of which, 230(A)-230(F) are included in FIG. 2.

As illustrated in FIG. 2, the onboard computing system 204 may be housed within the top cover 250 and may include a number of components, such as a computer 206, a storage device 208, the camera system 203, and an interface 210. The computer 206 may host the management module 202 configured to provide management operations of the flight and/or other portions of a task (e.g., a delivery of an item, pick-up of an item, object detection, etc.) of the UAV 200. For example, the management module 202 may analyze one or more images captured by the camera system 203, determine an appropriate delivery surface, determine objects near the UAV 200, determine a distance by which to lower a payload, a speed of lowering the payload, direct the propulsion system to position the UAV 200 according to this data, activate a release of a package from the payload holding mechanism 212, activate a release of a cable, and/or activate other functions of the task. In some embodiments, one or more of these functions may be performed utilizing one or more previously-stored machine-learning models.

In an example, the storage device 208 may be configured to store any operational data of the UAV 200, payload information (e.g., attributes of a payload item), task assignment data (e.g., indicating a delivery location, delivery time, marker information associated with the marker to be used for delivery/pick-up, etc.), generated or received data associated with the delivery surface, and/or received sensor data (e.g., one or more still images, a video feed, etc.). The operational data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. In some embodiments, the storage device 208 may store one or more machine-learning models to be utilized to perform various operations. As a non-limiting example, the storage device 208 may store a machine-learning model which has been previously trained to identify nearby objects from sensor data (e.g., still images, video feeds, etc.). The storage device 208 may store any suitable number of models that may be utilized for varying purposes depending on the tasks performed by the UAV 200.

The interface 210 may represent an interface for exchanging data as part of managing and/or controlling some of the operations of the UAV 200. In an example, the interface 210 may be configured to facilitate data exchanges with the management module 202, other components of the UAV 200, and/or other components remote from the UAV 200. As such, the interface 210 may include high speed interfaces, wired and/or wireless, serial and/or parallel, to enable fast upload and download of data to and from the onboard computing system 204.

As shown in FIG. 2, The camera system 203 may be positioned on top cover 250 or on the frame 226 of UAV 200. Although not shown, one or more camera systems (e.g., the camera system 203) may be mounted in different directions (e.g., downward looking cameras to identify ground objects and/or a landing zone for a payload while UAV 200 is in flight.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management module 202 may be configured to control at least a portion of the payload holding mechanism 212. For example, the management module 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 212 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the task of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been traveled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management module 202. In some examples, the propulsion system 218 may be configured to adjust itself without receiving instructions from the management module 202. Thus, the propulsion system 218 may operate semi-autonomously or autonomously.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV 200, similar to the UAV 200, may be deployed on a task to, for example, deliver and/or retrieve a payload (e.g., an item). The UAV 200 may autonomously or semi-autonomously complete or perform a portion of the task. For example, coordinates of a delivery location may be provided to the UAV 200 (e.g., as part of a process of ordering an item from an electronic catalog managed by a service provider). The UAV 200 may hold the payload in a payload holding mechanism and fly to the delivery location. Utilizing the camera system 203, the UAV 200 may capture one or more images (e.g., still and/or video) or other suitable sensor data. The images and/or sensor data may be utilized as input to one or more models to identify various conditions. By way of example, the model may utilize the sensor data for obstacle detection, marker detection, to identify landing conditions and/or operations, and/or the like. The UAV may navigate to the delivery location identified by a marker. Upon arrival (e.g., landing) at the location, the UAV 200 may release the payload from the payload holding mechanism. The UAV 200 may subsequently return to its starting location.

The UAV 200 may also include a computing module 260. In an example, the onboard computing system 204 may be integrated with the computing module 260. In another example, the onboard computing system 204 may be separate from but may interface with the computing module 260. The computing module 260 may include one or more processors and/or the computing module 260 may utilize one or more processors of the onboard computing system 204. The computing module 260 may be configured to perform distributed computing operations according to any suitable distributed computing techniques. By way of example, the computing module 260 may be configured to execute operations to train, retrain, and/or incrementally update one or more machine-learning models.

Figure 3:
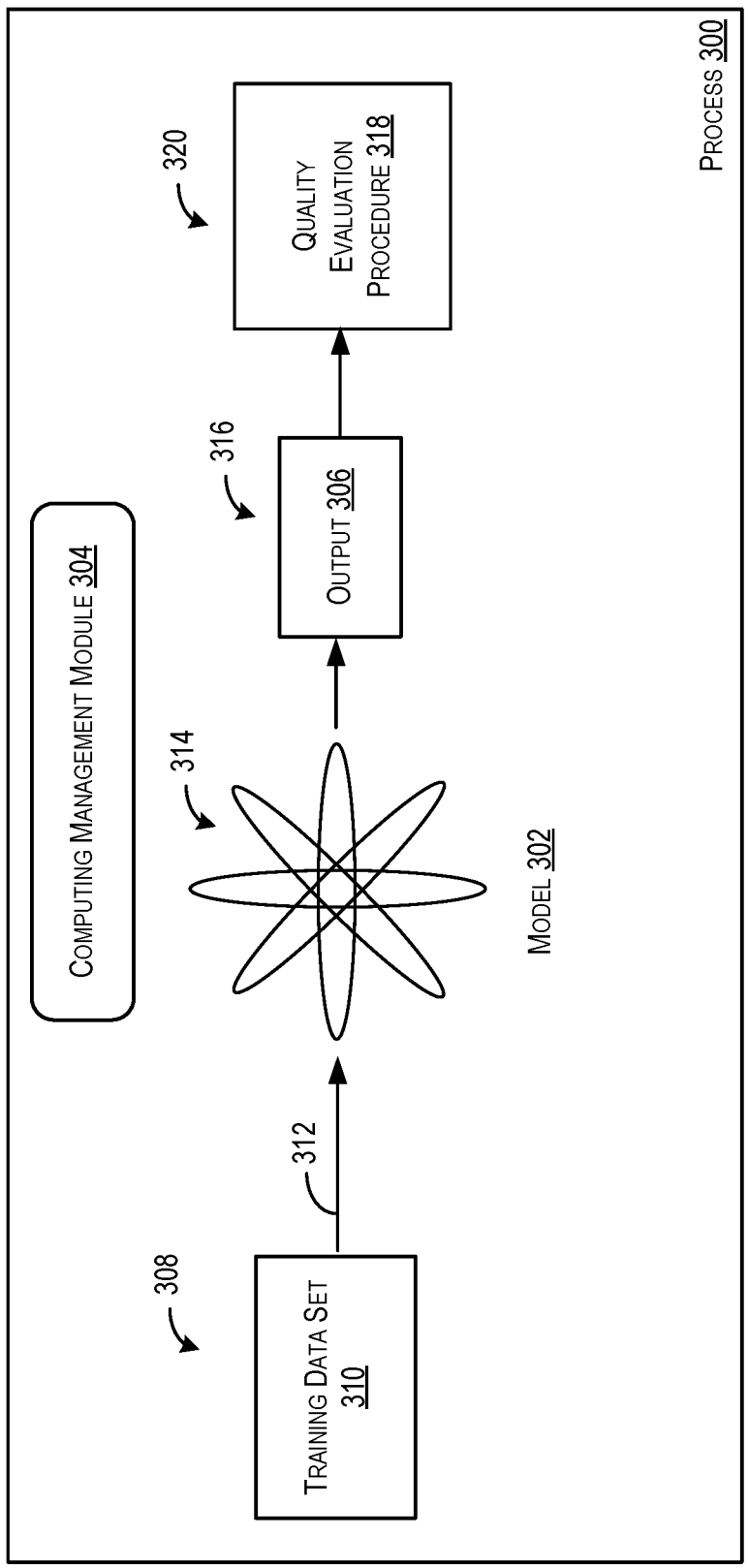
FIG. 3 illustrates an example process for training a model utilizing a computing management module, in accordance with at least one embodiment.

FIG. 3 illustrates an example process 300 for training a model 302 (e.g., an example of the model 116 of FIG. 1), in accordance with at least one embodiment. The process 300 may be performed by the computing management module 304 (e.g., an example of the computing management module 102 of FIG. 1). In some embodiments, the process 300 may be performed by multiple instances of the computing management module 304 operating as computing nodes of a distributed computing cluster (e.g., the idle UAV cluster 128 of FIG. 1). As described above, each instance of the computing management module 304 may be executed on a UAV of a fleet of UAVs managed by a service provider (e.g., the service provider computers 126 of FIG. 1).

In some embodiments, the process 300 of FIG. 3 may be executed to train the model 302 to provide output 306 (e.g., a prediction or indication or any suitable output) in response to receiving subsequent input. The specifics of the model 302 regarding the particular output provided given the particular input may vary based on the particular manner in which the model 302 is to be utilized. As a non-limiting example only, the model 302 may be utilized to provide output identifying objects from input data such as sensor data collected at a UAV during performance of a task (e.g., any suitable task performed by the UAV independent from the computing cluster such as a delivery task, a retrieval task, a data collection task, or the like).

In some embodiments, the process 300 may begin at 308, where training data set 310 may be obtained. In some embodiments, the particular data of the training data set 310 may also vary given the manner in which the model 302 is to be utilized and the techniques employed to train the model 302. However, in the ongoing example, the training data set 310 may include historical sensor data in which objects have previously been identified. In some embodiments, the sensor data of the training data set 310 may include any suitable sensor data collected by a UAV (e.g., during performance of a task). The sensor data may include images, videos, thermal readings, GPS data, radar data, sonar data, LIDAR data, weather data, environmental data, and the like. According to some embodiments, the training data set 310 may include any suitable task information such as, but not limited to, item attributes of an item being conveyed when the sensor data was collected, any suitable UAV data such as operational parameters of the mechanical and/or electrical operations of the UAV at the time the sensor data was collected, any device information of the UAV and/or sensors of the UAV, and/or any suitable information associated with the task, an item being delivered/retrieved, and/or the UAV.

Any suitable portion of the training data set 310 may submitted at 312 and utilized to train the search model 302 at 314. In some embodiments, the training of the search models 302-306 may utilize any suitable supervised, unsupervised, semi-supervised, and/or reinforced machine-learning technique. A supervised machine-learning technique is intended to refer to any suitable machine-learning algorithm that maps an input to an output based on example input-output pairs. A supervised learning algorithm (e.g., decision trees, Bayes algorithms, reinforcement-based learning for artificial neural networks, distance functions such as nearest neighbor functions, regression algorithms, etc.) may analyze training data (e.g., the training data set 310 that is annotated to label various instances of sensor data as being indicative of an object being located near the UAV) and produce an inferred function (also referred to as "a model"), which can be used to identify an output for a subsequent input. By executing the supervised learning algorithm on the training data set 310 submitted at 312, the model 302 may be trained to identify output 306 (e.g., objects near a UAV as indicated by sensor data). This is merely one example, other machine-learning techniques may be employed such as unsupervised learning techniques in which input/output pairs are not previously known. An unsupervised learning technique may seek to identify relationships between features of the training data set 310 in order to produce output 306. The specific type of machine learning algorithm and technique utilize may depend on the particular data used as training data and the particular output to be sought.

Once trained, or at any suitable time, the model 302 may be utilized (e.g., once deployed to a UAV) to identify output 306 (e.g., indicating the presence of an object) at 316 from subsequent input data (e.g., new sensor data collected by a UAV during performance of a task).

At any suitable time, the computing management module 304 may assess the quality (e.g., accuracy) of the model 302. By way of example, quality evaluation procedure 318 may be executed at 320 (e.g., after training, before deployment, after deployment, etc.). In some embodiments, quality evaluation procedure 318 may include providing an instance of training data of the training data set (e.g., a sensor data instance) as input to the a model 302 to obtain output. This output may be compared to the output already known from the training data set instance to determine if the output matches the already known value from the training data set instance. In some embodiments, all or some number of instances of training data may be provided to the model 302 and each output may be compared to the training data set 310. The computing management module 304 may identify a degree of accuracy of the model 302 based at least in part on an amount by which the output of the model 302 matches the order of the initial set of search results. By way of example, if 9 outputs out of 10 inputs match the outputs identified for corresponding instances of training data, the model 302 may be identified as being 90% accurate.

The model 302 may be distributed/deployed to one or more UAVs as discussed above. In some embodiments, the model 302 may be utilized at the UAV to identify output from input data (e.g., any suitable combination of sensor data, task information, UAV data, or the like) collected and/or stored at the UAV. The input data and corresponding output computed at the UAV using the model 302 may be utilized to retrain and/or adjust the model 302. By way of example, the input data and corresponding output computed at the UAV may be added to the training data set 310 and utilized to retrain the model. As another example, the sensor data and corresponding output collected at the UAV and the model 302 as previously trained may be utilized to compute, by the computing management module 304, an incremental update for the model 302. In some embodiments, the output provided by the model 302 as computed by the UAV during performance of a task may be evaluated (e.g., by an operator) to identify whether the output was accurate. In some cases, the output and corresponding sensor data, task information, or any operational parameters of the UAV may not be added to the training data set 310 unless the output computed at the UAV is deemed to be accurate.

The process 300 and/or the quality evaluation procedure may be performed any suitable number of times at any suitable interval and/or according to any suitable schedule such that the accuracy of the model 302 is improved over time. Similarly, although not depicted here, any suitable number of incremental updates may be computed by the computing management module 304 and utilized to update the model 302 such that the accuracy of the model may be improved over time.

Figure 4:
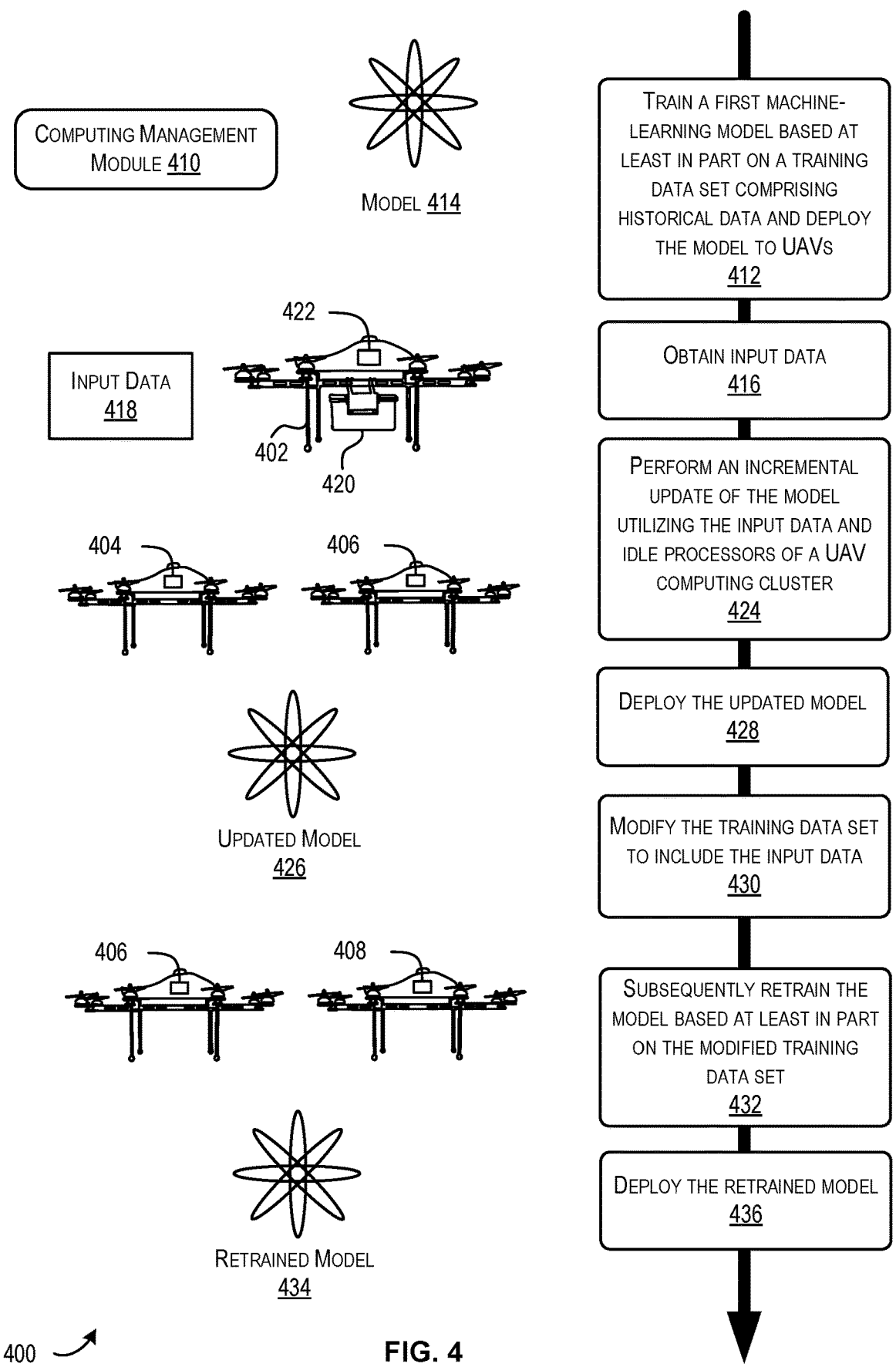
FIG. 4 illustrates an example flow for utilizing autonomous vehicles for delivery tasks and computing tasks associated with a distributed computing cluster, in accordance with at least one embodiment.

FIG. 4 illustrates an example flow 400 for utilizing autonomous vehicles for tasks (e.g., any suitable task performed by an autonomous vehicle independent from a computing cluster) and computing tasks associated with a distributed computing cluster, in accordance with at least one embodiment. Autonomous vehicles (AVs) 402, 404, 406 and 408 may each be examples of the AVs 104-110 and UAV 200 of FIGS. 1 and 2, respectively. The AVs of FIG. 4, while depicted as being aerial vehicles may be configured to move over land, air, water, or any suitable combination of the above. The flow 400 may be performed by the computing management module 410 may be an example of the computing management modules 102 and 304 of FIGS. 1 and 3, respectively.

The flow 400 may begin at 412, where a first machine learning model (e.g., model 414) may be trained (e.g., by the computing management module 410 utilizing any suitable number of AVs) based at least in part on a training data set comprising historical data (e.g., training data set 310 of FIG. 3). By way of example, the training data set may include any suitable data generated at the AV (e.g., sensor data) by any suitable component (e.g., one or more sensors or other mechanical and/or electrical components), device data and/ or capabilities information associated with the AV (e.g., serial numbers of device components, specifications of device components, etc.), data associated with an item corresponding to a delivery task (e.g., item attributes such as weight, dimensions, price, etc.), data associated with the delivery task (e.g., item data, customer data, starting location, ending location, delivery location, etc.), data associated with a data collection task (e.g., particular sensors to utilize for data collection, time and/or any suitable conditions for initiating and ceasing sensor data collection, etc.), or the like. In some embodiments, the data used to train the model 414 may be unrelated to AV operation and/or tasks performed by the AV. For example, the model 414 may be a model utilized by a remote system for any suitable purpose and the training data used to train the model 414 may be provided by the remote system. The computing management module 410 may manage a cluster of idle AVs (e.g., a set including the AV 404 and 406) to train the model 414 utilizing any suitable machine-learning technique and/or algorithm discussed herein. The computing management module 410 may deploy the model 414 to AV 402 (e.g., prior to the AV 402 being assigned to a subsequent delivery task). The computing management module 410 may store the model 414 for subsequent use.

At 416, new input data (e.g., input data 418) may be obtained by the computing management module 410. By way of example, the AV 402, may be assigned a delivery task involving delivering item 420 to a delivery location (e.g., a customer's residence). During performance of the delivery task, the AV 402 may collect sensor data (e.g., an example of the input data 418) utilizing sensor 422 (e.g., a camera or any suitable combination of one or more sensors and/or components of the AV 402). Any suitable data generated and/or stored by the AV 402 during the performance of the delivery task may be utilized as input data 418. During task performance, upon task completion, or at any suitable time, the AV 402 may provide input data 418 to computing management module 410.

At 424, an incremental update of the model 414 may be performed utilizing the input data 418. By way of example, the computing management module 410 may identify one or more AVs of the computing cluster managed by the computing management module 410 currently idle (e.g., having no current task) and assign those AVs a computing task corresponding to calculating an incremental update of the model 414. At a subsequent time, the computing management module 410 may receive updated model parameters from AV 404 and/or 406 and may update model 414 with the model parameters to generate updated model 426. The computing management module 410 may store both model 414 and updated model 426 for subsequent use. The incremental update of the model 414 may be automatically initiated according to a predetermined rule set (e.g., indicating an update should commence upon receiving new input data, according to a predefined schedule and/or frequency, etc.) and/or upon user request. If by user request, the incremental update may be initiated from a user interface provided by the computing management module 410. As a non-limiting example, input data 418 may be transmitted by the AV 402 to the computing management module 410 and presented to a user via a user interface (not depicted). The user may annotate the input data and/or request an additional action such as requesting an incremental update for the model 414.

At 428, the computing management module 410 may deploy the updated model 426 to one or more AVs. In some embodiments, the computing management module 410 may deploy the updated model 426 to any suitable number of the AVs in the fleet it manages (e.g., AVs 402-408). In some embodiments, the computing management module 410 may identify AVs currently actively performing a task (and/or a computing task) and delay deployment of the updated model 426 until those AVs are idle (e.g., not performing a task or a computing task) so as to avoid interrupting the AVs current activities.

At 430, the computing management module 410 may modify the training data set to include the input data collected at the AV 402. In some embodiments, the input data 418 may be include any annotation data provided by an operator discussed above. The steps 416-428 may be performed any suitable number of times and may correspond to any suitable number of AVs of the fleet. Accordingly, the updated model 426 may be further updated with additional input data, and updated again with still further additional input data, and so on. This may enable the computing management module 410 to ensure that AVs of the fleet are operating using a model that has factored in even the most recent input data (or relatively recent input data). In some embodiments, the computing management module 410 may selectively update AVs with an updated model. For example, AV 402 may perform a task in a particular area (e.g., a city, a neighborhood, etc.). Upon returning, the input data collected by the AV 402 may be utilized to update the model, and that version of the updated model may be provided to other AVs that are known to be performing subsequent tasks (e.g., delivery tasks, retrieval tasks, data collection tasks, etc.) in the same area. As new input data is obtained, the computing management module 410 may enforce an order or sequence for incremental updates. For example, the input data 418 may be added to a queue (or another suitable storage container) for update processing by the AV cluster. Another instance of input data received from another AV may be received and added to the queue. The computing management module 410 may ensure that the input data 418 is processed before (or at least with) the subsequent input data during the next incremental update. In some embodiments, the input data received since the last incremental update may be groups and utilized for an incremental update.

Operations may continue, as AVs are assigned tasks (e.g., delivery tasks delivering an item, retrieval tasks for retrieving an item, data collection tasks for collecting data, etc.), the computing management module 410 may remove them from the computing cluster and add newly idle AVs. For example, AV 406 may be assigned a delivery task and removed from the computing cluster managed by the computing management module 410. Subsequently, the AV 408 may complete a delivery task and transition to an idle state. Upon detecting the idle state, or at any suitable time (e.g., identifying a computing task to be performed), the computing management module 410 may add the AV 408 to the computing cluster to participate in future computing tasks.

At 432, the computing management module 410 may identify (e.g., based on a user request, according to a predefined schedule and/or frequency) that the model 414 is to be retrained and may assign a computing task associated with retraining the model 414 to the AVs 406 and 408 (e.g., AVs that are currently participating as part of the computing cluster). In some embodiments, the computing management module 410 may provide the historical training data (now including input data 418 and any subsequent input data provided by any suitable number of AVs) to the AVs of the cluster, or the AVs of the cluster may obtain the historical training data from any suitable and accessible storage location. The AVs of the cluster (e.g., now AV 406 and 408) may perform operations such as executing process 300 of FIG. 3 to retrain the model 414 to generate retrained model 434. The computing management module 410 may store the retrained model 434 separate from the model 414, or the computing management module 410 may replace model 414 with the retrained model 434. In some embodiments, the computing management module 410 may delete any models corresponding to incremental updates (e.g., updated model 426) after the retrained model 434 is generated. Accordingly, the computing management module 410 may be configured to store only the last model that was fully trained using a training data set and a last model generated from an incremental update.

At 436, the computing management module 410 may deploy the retrained model 434 to one or more AVs. In some embodiments, the computing management module 410 may deploy the retrained model 434 to any suitable number of the AVs in the fleet it manages (e.g., AVs 402-408). In some embodiments, the computing management module 410 may identify AVs currently actively performing a task (e.g., a delivery task, a retrieval task, a data collection task, or any suitable task performed by an AV independent from a computing cluster) or a computing task and delay deployment of the retrained model 434 until those AVs are in an idle state (e.g., not performing a delivery task or a computing task) so as to avoid interrupting the AVs' current activities.

Figure 5:
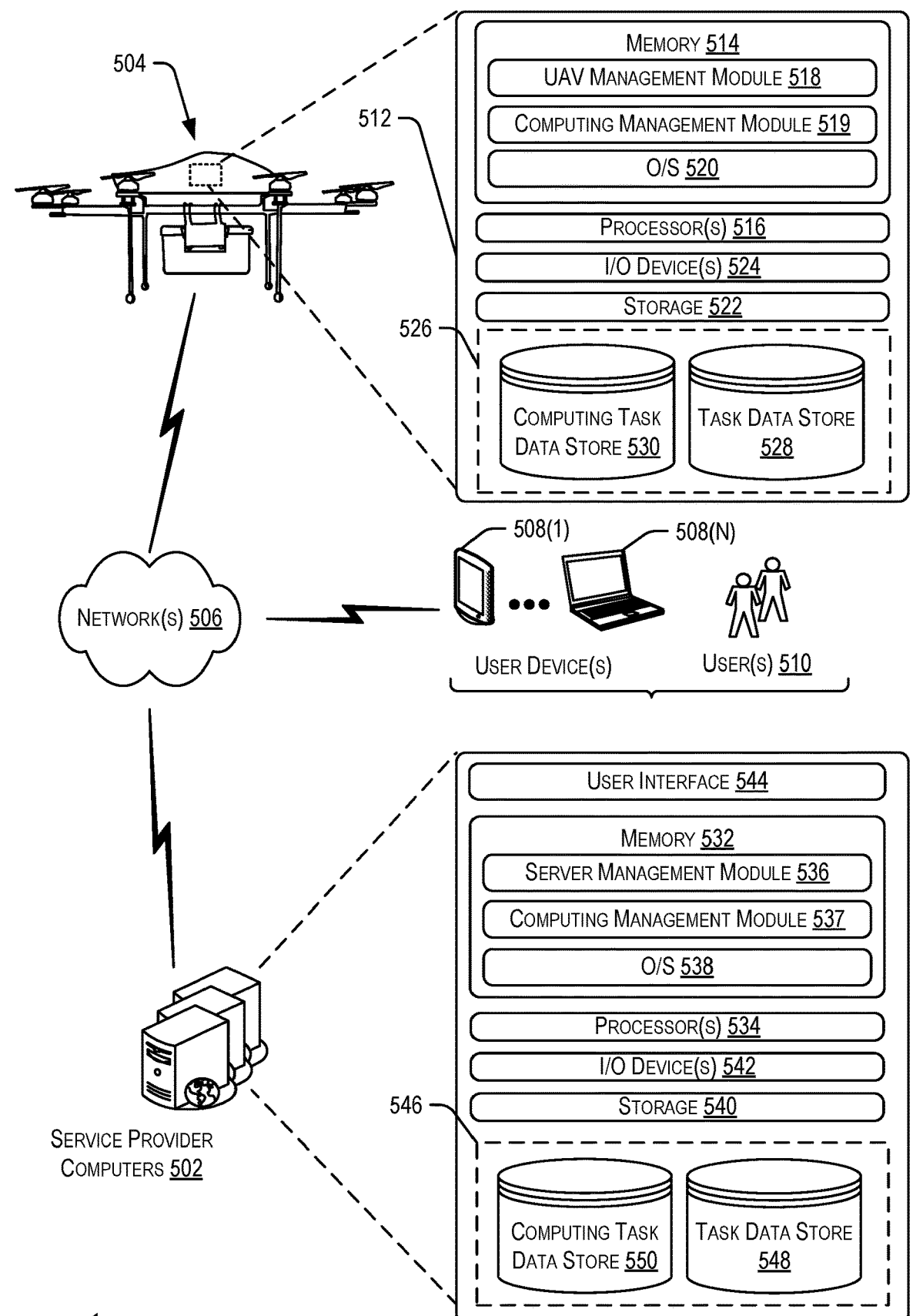
FIG. 5 illustrated an example architecture for using a UAV for delivery tasks and/or computing tasks, in accordance with at least one embodiment.

FIG. 5 illustrated an example system architecture 500 for using a UAV (e.g., the UAVs and/or AVs of FIGS. 1-5, etc.) to perform tasks and/or computing tasks, in accordance with at least one embodiment. The architecture 500 may include a service provider computers 502. The service provider computers 502 may support an electronic catalog (not shown) and interface with purchase and delivery services of a service provider that hosts the electronic catalog. In this manner, the service provider computers 502 may coordinate tasks (e.g., delivery of items, retrieval of items, data collection, etc.) to be performed by UAVs, such as UAV 504. These tasks may relate to picking up and/or delivering item(s) to customers of the service provider. Performing such tasks may also include performing one or more data collection tasks. In some examples, the service provider computers 502 may be a stand-alone service operated on its own or in connection with another system that hosts the electronic catalog. In either example, the service provider computers 502 may be in communication with the UAV 504 via one or more network(s) 506 (hereinafter, "the network 506"). The network 506 may include any one or a combination of many different types of networks, such as cable networks, the Internet, wireless networks, cellular networks, radio networks, and other private and/or public networks. Thus, the service provider computers 502 may be configured to provide back-end control of the UAV 504 prior to, during, and/or after completion of its task(s). In some examples, the UAV 504 may be configured to accomplish its task (e.g., deliver an item to a location associated with the customer, etc.) with little to no communication with the service provider computers 502.

User devices 908(1)-908(N) (hereinafter, "the user device 508") may also be in communication with the service provider computers 502 and the UAV 504 via the network 506. The user device 508 may be operable by one or more users 510 (hereinafter, "the users 510") to access the service provider computers 502 (or another system hosting the electronic catalog) and the UAV 504 via the network 506. The user device 508 may be any suitable device capable of communicating with the network 506. For example, the user device 508 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 508 may be in communication with the service provider computers 502 via one or more web servers constituting an electronic catalog (not shown) connected to the network 506 and associated with the service provider computers 502.

Turning now to the details of the UAV 504, an example of the UAV 200, may include an onboard computer 512 including at least one memory 514 and one or more processing units (or processor(s)) 516. The processor(s) 516 may be implemented as appropriate in hardware, computer-executable instructions, software, firmware, or combinations thereof. Computer-executable instruction, software or firmware implementations of the processor(s) 516 may include computer-executable or machine-executable instructions written in any suitable programming language to perform the various functions described. The memory 514 may include more than one memory and may be distributed throughout the onboard computer 512. The memory 514 may store program instructions (e.g. UAV management module 518 that may manage tasks (e.g., delivery tasks, retrieval tasks, data collection tasks, etc.) and/or the computing management module 519 that may manage computing tasks) that are loadable and executable on the processor(s) 516, as well as data generated during the execution of these programs.

The UAV management module 518 (e.g., and example of the management module 202 of FIG. 2) may be configured to manage task performance (e.g., delivery, pickup/retrieval, data collection, etc.). By way of example, the UAV management module 518 can manage performance of a delivery task. Generally, a delivery task is associated with conveyance of an item from one location to another. In some embodiments, a data collection tasks can be part of the delivery task. As an example, the UAV 504 may be used to deliver at item from a fulfillment center (or another facility from which an item may be obtained) to a predefined delivery location (e.g., a customer's home), and/or the UAV 504 may be used to pick up an item from a predefined location (e.g., the customer's home, office, a shipping provider, etc.) and convey the item to the fulfillment center (or another facility such as a returns facility, a shipping provider, etc.). The UAV management module 518 may access any suitable data from the task data store 528 to perform the delivery task. In some embodiments, the UAV management module 518 may be configured to mechanically and/or electronically perform flight, motion, and/or any suitable semi-autonomous and/or autonomous operations of the UAV. According to some examples, the UAV management module 518 may be configured to perform a data collection tasks to collect any suitable data (e.g., data collected by the I/O device(s) 524 such as: sensor data, flight data, images, video, thermal readings, sonar data, LIDAR data, radar data, global positioning data, environmental readings, etc.) during performance of a delivery task. Data collected by the UAV management module 518 may be collected in accordance with any suitable predefined data collection rules stored at the UAV 504 and or an assigned data collection task. In some embodiments, the data collection rules stored at the UAV 504 may define one or more data collection tasks to be performed. The UAV management module 518 may be configured to store collected data in the task data store 528 and/or communicate (e.g., transmit via network(s) 506) any suitable portion of such data to the service provider computer(s) 502 at any suitable time. For example, the UAV management module 518 may be configured to transmit data collected during a delivery task at one or more times during the performance of the delivery task, upon completion of the delivery task, according to a predetermined scheduled, frequency, and/or rule set, upon receiving a request for such data from the service provider computer(s) 502, or at any suitable time.

The computing management module 519 may be configured to manage computing task performance. A computing task may relate to performing any suitable operation as part of a distributed computing cluster (e.g., when the UAV 504 is operating as a master or computing node of a distributed computing cluster). Any suitable data associated with a computing task may be stored in computing task data store 530. As a non-limiting example, the UAV 504 may be instructed (e.g., by the computing management module 537 of the service provider computer(s) 502) to train a model using particular training data. In some embodiments, the computing management module 519 may receive the request. In some embodiments, the training data set to be utilized for the computing task may be received from the computing management module 537 (e.g., via the request or otherwise) and/or the training data set may be obtained by the computing management module 537 via a data store accessible to the computing management module 537 (e.g., a predefined data store, a data store identified by the computing management module 537, etc.). It should be appreciated that the computing management module 519 may obtain any suitable data associated with the computing task from the computing management module 537 and/or a predefined data store and/or a data store identified by the computing management module 537. The computing management module 519 may be configured to perform any suitable operations associated with the computing task. The computing management module 519 may be configured to store computed data (e.g., model update parameters, a newly trained model, etc.) in the computing task data store 530 and/or communicate (e.g., transmit via network(s) 506) any suitable portion of such data to the service provider computer(s) 502 at any suitable time. The computing management module 519 is discussed in further detail with respect to FIG. 6. It should be appreciated that any suitable portion of functionality described with respect to the computing manager module 519 and/or the computing management module 537 may be performed at the UAV 504 and/or at the service provider computer(s) 502.

Depending on the configuration and type of memory including the UAV management module 518 and/or the computing management module 519, the memory 514 may be volatile (such as random access memory (RAM)) and/or non-volatile (such as read-only memory (ROM), flash memory, or other memory). The memory 514 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. Turning to the contents of the memory 514 in more detail, the memory 514 may include an operating system 520 and one or more application programs, modules or services for implementing the features disclosed herein including at least the UAV management module 518 and/or the computing management module 519.

In some examples, the onboard computer 512 may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 512. The modules of the onboard computer 512 may include one or more components. The onboard computer 512 may also include input/output (I/O) device(s) 524 and/or ports, such as for enabling connection with a keyboard, a mouse, a pen, a voice input device, a touch input device, a display, speakers, a printer, or other I/O device. The I/O device(s) 524 may enable communication with the other systems of the UAV 504 (e.g., other parts of the control system, power system, communication system, navigation system, propulsion system, and the retaining system). The input/output (I/O) device(s) 524 may include any suitable combination of sensors including, but not limited to, a camera, a radar device, a LIDAR device, a sonar device, a global positioning device (GPS), a thermal device, an infrared device, or the like).

The onboard computer 512 may also include data store 526 stored in memory 514 and/or storage 522. The data store 526 may include one or more databases, data structures, or the like for storing and/or retaining information associated with the UAV 504. In some examples, the data store 526 may include databases, such as task data store 528 and computing task data store 530. Task data store 528 may be configured to store data associated with any suitable delivery task (e.g., task assignment data identifying delivery/pickup time, marker information associated with a delivery/pickup location, landing zone information, maps, historical sensor data associated with past delivery/pickup tasks, customer data, item information associated with the payload to be carried by the UAV 504, etc.). Computing task data store 530 may be configured to store any suitable data associated with a computing task. In the examples in which the UAV 504 is assigned a computing task associated with training, retraining, and/or incrementally updating a machine-learning model, the computing task data store 530 can store a last-trained machine-learning model, a last incrementally updated machine-learning model, any suitable training data, or the like. Generally, as the computing tasks may be of any suitable nature, the computing task data store 530 may store any suitable type of data associated with a computing task to be performed by the UAV 504.

Turning now to the details of the user device 508. The user device 508 may be used by the user(s) 510 for interacting with the service provider computers 502. The user device 508 may therefore include a memory, a processor, a user-interface, a web-service application, and any other suitable feature to enable communication with the features of architecture 500. The web service application may be in the form of a web browser, an application programming interface (API), virtual computing instance, or other suitable application. In some examples, when the service provider computers 502 are part of, or share an association with, an electronic catalog, the user device 508 may be used by the user(s) 510 for procuring one or more items from the electronic marketplace. The user(s) 510 may request delivery of the purchased item(s) and/or pickup of item(s) using the UAV 504, or the service provider computers 502 may coordinate such delivery/pickup on its own.

In some embodiments, the user device 508 may be utilized to interact with the service provider computers 502.

The service provider computers 502, perhaps arranged in a cluster of servers or as a server farm, may host web service applications. These servers may be configured to host a website (or combination of websites) viewable via the user device 508. The service provider computers 502 may include at least one memory 532 and one or more processing units (or processor(s)) 534. The processor(s) 534 may be implemented as appropriate in hardware, computer-executable instructions, software, firmware, or combinations thereof. Computer-executable instruction, software or firmware implementations of the processor(s) 534 may include computer-executable or machine-executable instructions written in any suitable programming language to perform the various functions described.

The memory 532 may include more than one memory and may be distributed throughout the service provider computers 502. The memory 532 may store program instructions (e.g., server management module 536, the computing management module 537) that are loadable and executable on the processor(s) 534, as well as data generated during the execution of these programs. Depending on the configuration and type of memory including the server management module 536 and/or the computing management module 537, the memory 532 may be volatile (such as random access memory (RAM)) and/or non-volatile (such as read-only memory (ROM), flash memory, or other memory). The service provider computers 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM.

Turning to the contents of the memory 532 in more detail, the memory 532 may include an operating system 538 and one or more application programs, modules or services for implementing the features disclosed herein including at least the server management module 536. The server management module 536, in some examples, may function similarly to the UAV management module 518. For example, when the UAV 504 is in network communication with the service provider computers 502, the UAV 504 may receive at least some instructions from the service provider computers 502 as the server management module 536 is executed by the processors 534. In some examples, the UAV 504 executes the UAV management module 518 (e.g., to implement the features described with respect to the management module 202 of FIG. 2) to operate independent of the service provider computers 502.

The server management module 536 may be configured to manage the assignment of delivery tasks (e.g., delivery and/or pickup task) to a variety of UAVs (e.g., a fleet of two or more UAVs). The server management module 536 may be configured to receive order information corresponding to an item procured by the user 510 from the electronic catalog (or an item to be picked up). Order information may include item information associated with one or more items, a delivery time, a marker identifier corresponding to a location, one or more locations associated with the delivery tasks such as a starting location, one or more delivery/pickup locations, an ending location, and the like. In some embodiments, the server management module 536 may operate at a service provider's fulfillment center (or another suitable location) from which items are transported to the service provider's customers by autonomous vehicles (e.g., the UAV 504). The server management module 536 may be configured to generate a delivery task for a UAV and select an appropriate UAV (e.g., the UAV 504) to be assigned to the delivery task. The server management module 536 may maintain status information indicating a current state of each of the fleet of UAVs. By way of example, the server management module 536 may maintain a record of an association between a UAV and a delivery task, an estimated completion time for the delivery task, and the like. In some embodiments, the status information may indicate an active and/or an idle state. This may be achieved using a flag or other indicator, or the assignment of a delivery task may be indication of an active state of the UAV. When the UAV has no current delivery task assigned, the server management module 536 may maintain the state of the UAV as "idle."

The server management module 536 may be configured to receive data collected by the UAV 504 at any suitable time. In some embodiments, the server management module 536 may provide one or more interfaces (e.g., user interfaces 544) for presenting the received data. The user interfaces 544 may enable the user 510 to annotate (e.g., associate the data with a predefined or user-defined label), delete, store, and/or direct the data to any suitable location. In some embodiments, the user interfaces 544 may provide the user the ability to indicate some portion of the collected data is to be utilized for a computing task (e.g., training, retraining, incrementally updating a machine-learning model, performing another computation of any suitable type, etc.). In some embodiments, the user interfaces 544 may provide the user the ability to schedule and/or request a computing task to be performed (e.g., request an incremental update of a machine-learning model) immediately, or at a user-defined and/or predefined time associated with computing tasks of the kind requested.

The computing management module 537 may be configured to manage computing task performance. The computing management module 537 may operate as a master node of a distributed computing cluster. The computing management module 537 may perform any suitable load balancing, task assignment, configuration management, monitoring, or other suitable operations required to manage a number of computing nodes of the distributed computing cluster. The computing management module 537 may initialize and manage the distributed computing cluster utilizing any suitable number of UAVs that have been identified as being in an idle state. In some embodiments, the computing management module 537 may access and maintain a record (e.g., a same or different record from the one managed by the server management module 536) that indicates an association between a UAV and a computing task, an estimated completion time for the computing task, and the like. In some embodiments, the computing management module 537 may receive (e.g., from the user interface 544, from another system according to a predefined schedule and/or frequency) or detect (e.g., according to a predefined schedule and/or frequency) that a computing task is to be performed. If a distributed computing cluster has not previously been initiated, the computing management module 537 may identify a set of idle UAVs from the record(s) maintained by either the server management module 536 and/or the computing management module 537. A UAV in an idle state may be considered one that does not currently have a delivery task assigned. In some embodiments, a UAV may be considered to be in an idle state when it is not currently assigned a task in general, delivery or computing. The computing management module 537 may continue to monitor the status of the fleet of UAVs (both those operating in the computing cluster and those that are not operating in the computing cluster). If UAVs of the computing cluster are assigned a delivery task, the computing management module 537 may perform any suitable operations to reassign their computing task to another UAV of the computing cluster. If additional UAVs of the fleet become idle, the computing management module 537 may perform any suitable operation to add those idle UAVs to the computing cluster to share a task already being computed by the cluster or to perform a different computing task. Accordingly, the computing management module 537 may perform any suitable distributed computing operations for load balancing, task assignment, configuration management, and the like. Although depicted as part of the service provider computer(s), it should be appreciated that any suitable portion of the computing management module 537 may be executed in whole, or in part, at the UAV (e.g., as part of the computing management module 519).

Although depicted as separate modules, it should be appreciate that computing management module 519 and computing management module 537 may operate, at least in part, as part of the UAV management module 518 or the server management module 536, respectively.

In some examples, the service provider computers 502 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 502. The modules of the service provider computers 502 may include one or more components. The service provider computers 502 may also include input/output (I/O) device(s) 542 and/or ports, such as for enabling connection with a keyboard, a mouse, a pen, a voice input device, a touch input device, a display, speakers, a printer, or other I/O device.

In some examples, the service provider computers 502 may include a user interface 544. The user interface 544 may be utilized by an operator, or other authorized user to access portions of the service provider computers 502. In some examples, the user interface 544 may include a graphical user interface, web-based applications, programmatic interfaces such as application programming interfaces (APIs), or other user interface configurations. The user interface 544 may be utilized by the user 510 to procure items and/or procure delivery and/or pickup services from the service provider. As described, above, the user interface 544 may be configured to enable user 510 to initiate a computing task or interact with collected data associated with a current and/or subsequent computing task.

The service provider computers 502 may also include data store 546. The data store 546 may include one or more databases, data structures, or the like for storing and/or retaining information associated with the UAVs of the fleet (e.g., UAV 504). In some examples, the data store 546 may include databases, such as task data store 548 and computing task data store 550. Task data store 548 may be configured to store data associated with any suitable task (e.g., task assignment data identifying delivery/pickup time, marker information associated with a delivery/pickup location, data (e.g., sensor data, operational data, etc.) collected/obtained by the UAV, landing zone information, maps, historical sensor data associated with past delivery/pickup tasks, customer data, item information associated with the payload to be carried by a UAV, etc.). Computing task data store 550 may be configured to store any suitable data associated with a computing task. In the examples in which a computing cluster is currently or subsequently performing a computing task associated with training, retraining, and/or incrementally updating a machine-learning model, the computing task data store 550 can store a last-trained machine-learning model, a last incrementally updated machine-learning model, any suitable training data (e.g., a historical training data set, new training data received by any suitable number of UAVs, etc.), or the like. Generally, as the computing tasks may be of any suitable nature, the computing task data store 550 may store any suitable type of data associated with a computing task to be performed by the computing cluster. Thus, in some examples, at least a portion of the information from the databases in the data store 526 is copied to the databases of the data store 546, e.g., periodically, occasionally, in connection with an event, or otherwise. In this manner, the data store 546 may have up-to-date information, without having to maintain the databases. In some examples, this information may be transferred upon completion of a task (e.g., a delivery task, a retrieval/pickup task, a data collection task, etc.), according to a predetermined schedule or frequency, upon demand, or at any suitable time. In some examples, at least a portion of the information from the databases in the data store 546 is copied to the databases of the data store 526, e.g., periodically, occasionally, in connection with an event, or otherwise. In this manner, the data store 526 may have up-to-date information. In some examples, this information may be transferred upon completion of a computing task, according to a predetermined schedule or frequency, upon demand, or at any suitable time.

Figure 6:
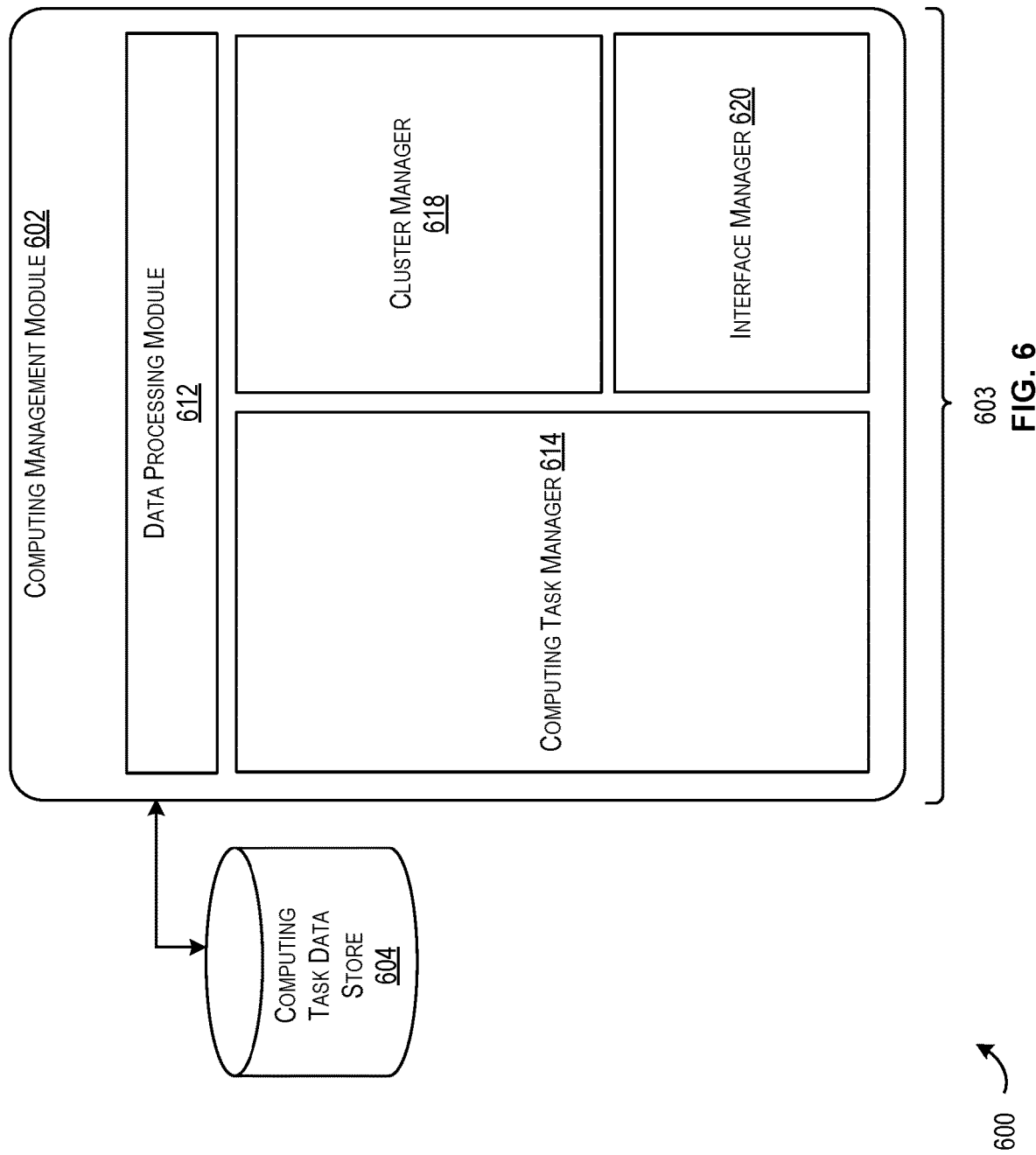
FIG. 6 is a schematic diagram of an example computer architecture for the computing management module, including a plurality of modules that may perform functions in accordance with at least one embodiment.

FIG. 6 is a schematic diagram of an example computer architecture 600 for a computing management module 602 (e.g., an example of the computing management modules 102, 304, 410, 519 and 537 of FIGS. 1 and 3-5, respectively), including a plurality of modules 603 that may perform functions in accordance with at least one embodiment. The modules 603 may be software modules, hardware modules, or a combination thereof. If the modules 603 are software modules, the modules 603 can be embodied on a computer readable medium and processed by a processor in any of the computer systems described herein. It should be noted that any module or data store described herein, may be, in some embodiments, be a service responsible for managing data of the type required to make corresponding calculations. The modules 603, or some portion of the modules 603, may be operate at the service provider computer(s) 502 of FIG. 5, and/or the modules may operate as part of the computing management module 519 operating at the UAV.

In the embodiment shown in the FIG. 6, a computing task data store 604 is shown, although data can be maintained, derived, or otherwise accessed from various data stores, either remote or local to the computing management module 602, to achieve the functions described herein. In at least one embodiment, the data stores described herein may be physically located on the UAV 504 of FIG. 5 or alternatively, any suitable combination of the data stores may be operated as part of the service provider computer(s) 502. The computing management module, as shown in FIG. 6, includes various modules such as a data processing module 612, a computing task manager 614, a cluster manager 618, and an interface manager 620 are shown. Some functions of the modules 603 are described below. However, for the benefit of the reader, a brief, non-limiting description of each of the modules is provided in the following paragraphs. The functions of each of the modules 603 may be combined in any suitable manner and/or the functions described may be provided by modules and/or systems not depicted. Accordingly, the computer architecture 600 is illustrative and is not intended to be limiting in nature.

In at least one embodiment, the computing management module 602 includes the data processing module 612. Generally, the data processing module 612 may be utilized to receive any suitable information from any suitable source with respect to any example provided herein. The data processing module 612 may include any suitable number of application programming interfaces with which the functionality of the computing management module 602 may be invoked. In some embodiments, the data processing module 612 may be configured to receive one or more training data set (e.g., training data set 308 of FIG. 3). The data processing module 612 may be configured to store the training data set(s) in computing task data store 604 (e.g., the computing task data store 530 and/or 550 of FIG. 5).

The computing management module 602 may include a cluster manager 618. The cluster manager 618 may be configured to operate as a master node and/or assign a master node from a number of computing resources (e.g., UAVs and/or AVs of FIGS. 1-5). In some embodiments, the cluster manager 618 may be configured to access state information and/or task information to identify/detect computing resources (e.g., UAVs) that are idle (e.g., not currently assigned a task and/or a computing task). The cluster manager 618 may add an idle UAV to the cluster and/or remove a UAV from the cluster upon detecting a UAV has been assigned a task (e.g., tasks such as a delivery/retrieval/data collection tasks). In some embodiments, the cluster manager 618 may interrupt a computing task currently being performed by a first UAV and reassign the computing task to another UAV of the cluster when it detects the first UAV has been assigned a delivery task (or any suitable task to be performed by the first UAV independent of the computing cluster). Accordingly, the cluster manager 618 may manage an every changing cluster of UAVs, while ensuring that tasks to be performed by the UAV take precedence over computing tasks to be performed by the cluster. In some embodiments, the cluster manager 618 may perform load balancing, task assignment, cluster management, monitoring, or any suitable operation associated with the cluster. In some embodiments, the cluster manager 618 may maintain a queue or other suitable container of input data to be utilized for a subsequent computing task. Any suitable information regarding the computing task may be maintained in the queue with the input data. In some embodiments, when the computing tasks in the queue are related (e.g., multiple incremental updates to a common model) the cluster manager 618 may be configured to group the tasks and input data together and providing such data as a single computing task to be performed by the cluster. In some embodiments, the cluster manager 618 may act as a master node of the computing cluster and/or the cluster manager 618 may select a computing node (e.g., a UAV) of the computing cluster to operate as the master node.

The computing management module 602 may include a computing task manager 614. The functionality of the computing task manager 614 may be invoked by the data processing module 612 and/or the cluster manager 618. In some embodiments, the computing task manager 614 may operate at a computing node of the cluster (e.g., a UAV), while the cluster manager 618 operates as part of the service provider computers 502 of FIG. 5. In some embodiments, the computing task manager 614 may operate in part at a UAV. The computing task manager 614 may be configured to perform any suitable operations instructed by the cluster manager 618 and/or received by the data processing module 612. The particular operations may depend on the context in which the computing management module 602 is utilized. Given some of the examples provided in the preceding figures, the computing task manager 614 may be configured to execute any suitable operations to train, retrain, and/or compute an incremental update of one or more machine-learning models utilizing any suitable machine-learning algorithm and/or technique.

In some embodiments, the computing task manager 614 may be configured to transmit any suitable data (e.g., a model, model parameters, etc.) computed by processor of the device on which the computing task manager 614 operates, to any suitable location. By way of example, the computed data may be transmitted to the service provider computers 502 (or the cluster manager 618 operating at the service provider computers 502 and/or the UAV) at any suitable time and/or according to any suitable schedule, frequency, or occurrence of an event as specified in a predetermined rule set.

In some embodiments, the interface manager 620 may be configured to provide any suitable user interface (e.g., one or more graphical user interfaces) for viewing computing data (e.g., sensor data or any suitable data collected or stored at a UAV). In some embodiments, the interface manager 620 may provide interfaces for annotating and/or obtaining input data and/or requesting a computing task to be performed by the computing cluster. The interface manager 620 may provide a user the ability to designate certain instances of input data to be utilized for the computing task (e.g., training and/or incrementally updating a model) and/or the user may be allowed to exclude one or more instances of input data from being utilized for the computing task. In some embodiments, the user interfaces provided by the interface manager 620 may receive any suitable input (e.g., annotations of the input data) and store the input as an association with the data set and/or data set instances to which the input relates. By way of example, a user may be presented with an image as captured by a UAV during task performance (e.g., delivery task performance, data collection task performance, etc.).

The user may annotate the image to indicate that the image contains a house, a dog, shrubbery, and a mail box. The annotations may be stored with the image for subsequent processing. In some embodiments, the user may request that a model used to identify objects from images and/or video, be trained, retrained, and/or incrementally updated using the image (and the annotations). In some embodiments, the user interfaces may provide input options to designate a particular day or time at which the computing task is to be initiated and/or the computing task may be initiated based at least in part on predetermined rules (e.g., indicating incremental updates are to be performed every hour, every 5 minutes, every day, etc., and retraining is to occur every 24 hours, every week, every $1^{st}$ of the month, etc.).

Figure 7:
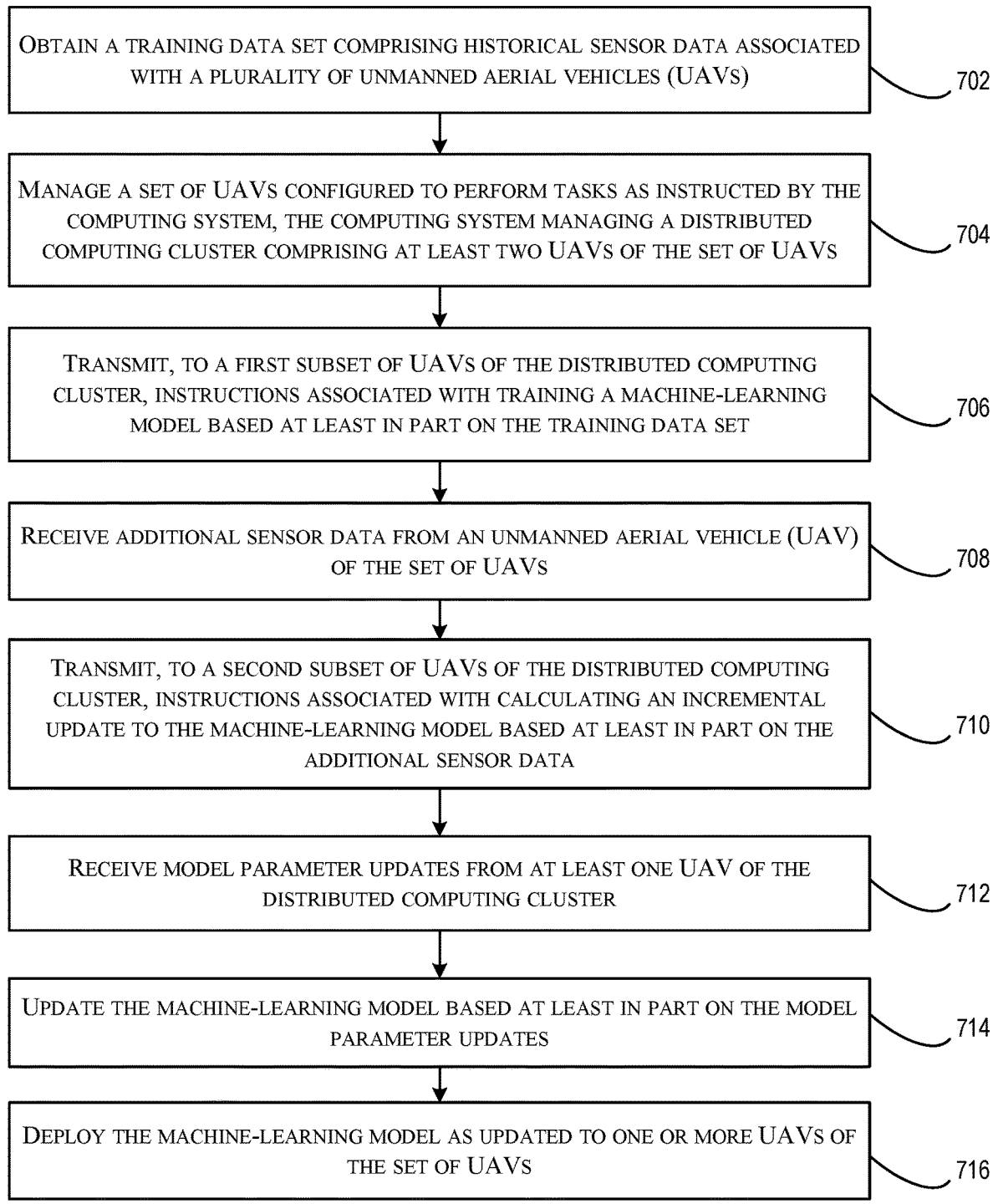
FIG. 7 illustrates an example method for training and updating a machine-learning model utilizing the computing management module, in accordance with at least one embodiment.

FIG. 7 illustrates an example method 700 for training and updating a machine-learning model (e.g., the model 116 of FIG. 1, the model 302 of FIG. 3, etc.) utilizing the computing management module, in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 603 of the computing management module 602 of FIG. 6 which may operate in whole or in part on a UAV, such as the UAV 504 of FIG. 5, and/or the service provider computer(s) 502 of FIG. 5. As a non-limiting example, the method 700 may be performed by a computing device (e.g., the service provider computer(s) 502) having one or more processors and a memory storing executable instructions that, upon execution by the one or more processors, cause the computing device to perform the operations of method 700.

The method 700 may begin at 702, where a training data set may be obtained by a computing system (e.g., the computing task manager 614, a component of the computing management module 602 of FIG. 6). The training data set may comprise historical sensor data associated with a plurality of unmanned aerial vehicles (UAVs) (e.g., including the UAV 504 of FIG. 5).

At 704, the computing system (e.g., the cluster manager 618 of FIG. 6) may manage a set of UAVs configured to perform tasks as instructed by the computing system. In some embodiments, the computing system managing a distributed computing cluster comprising at least two UAVs of the set of UAVs (e.g., UAVs 402, 404, 406, and 408 of FIG. 4).

At 706, the computing system (e.g., the cluster manager 618) may transmit instructions associated with training a machine-learning model based at least in part on the training data set.

At 708, the computing system may receive additional sensor data from an unmanned aerial vehicle (UAV) of the set of UAVs (e.g., the UAV 402 of FIG. 4). In some embodiments, this sensor data may be collected during performance of a delivery task associated with the UAV. By way of example, the delivery task could include delivering and/or picking up an item and the sensor data may be collected by at least one of a camera, a radar device, a LIDAR device, a sonar device, a global position system device, or the like.

At 710, the computing system (e.g., the computing task manager 614 of FIG. 6) may transmit to a second subset of UAVs of the distributed computing cluster, instructions associated with calculating an incremental update to the machine-learning model based at least in part on the additional sensor data. An incremental update may refer to calculating model parameter updates based at least in part on a previously trained (or previously incrementally updated) machine-learning model and at least one instance of sensor data (e.g., the additional sensor data comprising one or more instances of sensor data collected by one or more corresponding UAVs).

At 712, the computing system (e.g., the computing task manager 614) may receive model parameter updates from at least one UAV of the distributed computing cluster.

At 714, the computing system (e.g., the computing task manager 614) may update the machine-learning model based at least in part on the model parameter updates. In some embodiment, the computing system may replace one or more previously incrementally updated models with the newly updated model.

At 716, the computing system (e.g., the computing task manager 614) may deploy the machine-learning model as updated to one or more UAVs of the set of UAVs. In some embodiments, the computing system (e.g., the computing task manager 614) may identify idle UAVs (e.g., UAVs that are not actively performing a delivery task and/or a computing task). In some embodiments, the computing system may monitor task performance by the UAVs to delay deployment for UAVs that were in the process of performing a task, and cause the machine-learning model for those UAVs to be deployed when it is detected that the UAVs has transitioned to an idle state.

Figure 8:
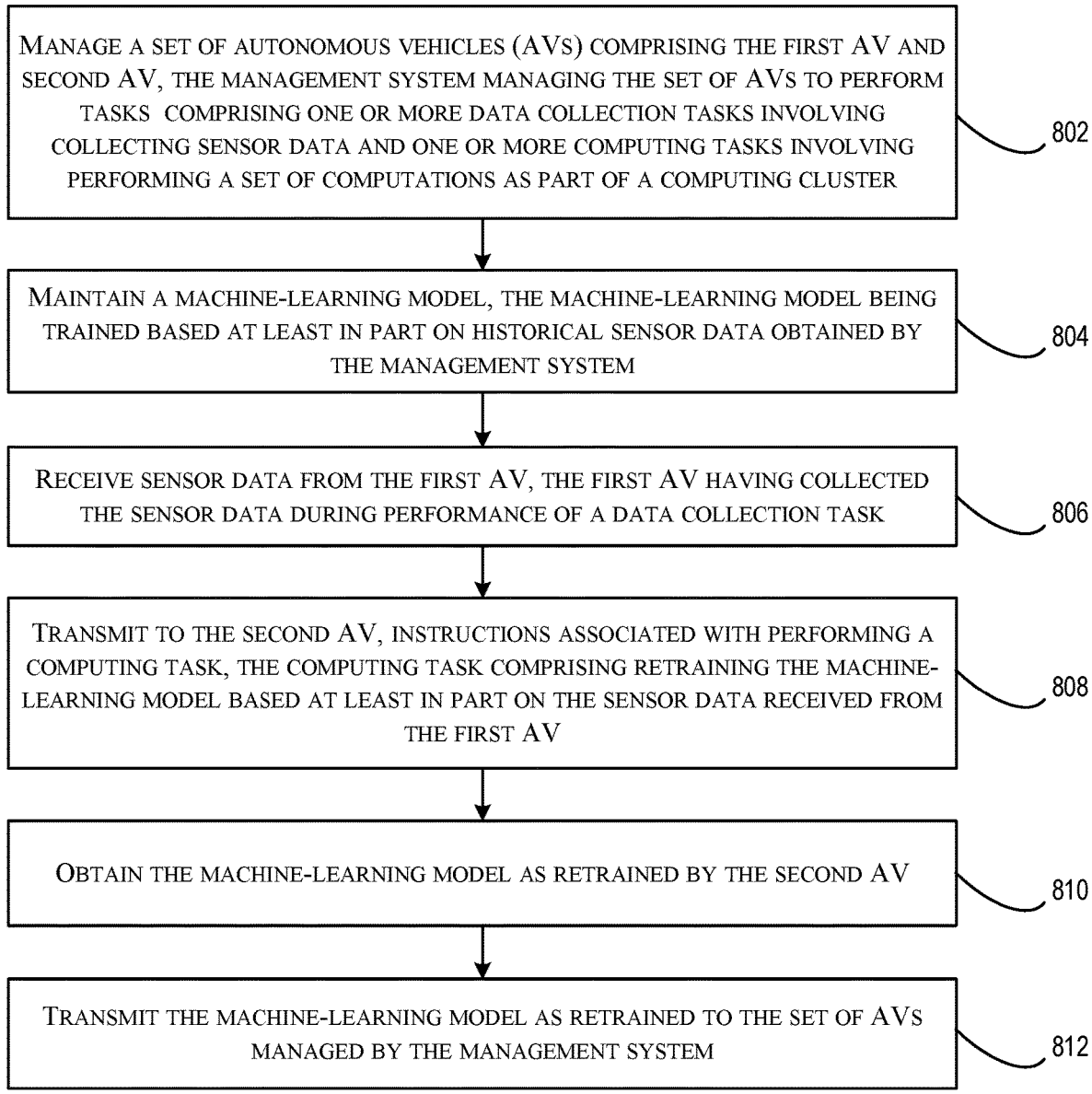
FIG. 8 illustrates another example method for training and updating a machine-learning model utilizing the computing management module, in accordance with at least one embodiment.

FIG. 8 illustrates another example method 800 for training and updating a machine-learning model (e.g., the model 116 of FIG. 1, the model 302 of FIG. 3, etc.) utilizing the computing management module, in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a system comprising a first autonomous vehicle (AV) comprising a first processor, a second AV comprising a second processor, and a management system, comprising one or more processors and a non-transitory computer readable media comprising instructions that, when executed with the one or more processors, causes the management system to perform the method 800. The first and second AVs may individually be an example of the UAV 504 of FIG. 5.

The method 800 may begin at 802, where the management system (e.g., the service provider computer(s) 502 of FIG. 5) may manage a set of autonomous vehicles (AVs) comprising the first AV and second AV. In some embodiments, the management system manages the set of AVs to perform tasks comprising one or more data collection tasks involving collecting sensor data and one or more computing tasks involving performing a set of computations as part of a computing cluster.

At 804, the management system (e.g., the computing management module 602) may maintain a machine-learning model (e.g., the model 116 of FIG. 1, the model 302 of FIG. 3, etc.). In some embodiments, the machine-learning model may be trained (e.g., via the UAVs of a cluster managed by the cluster manager 618 of FIG. 6) based at least in part on historical sensor data obtained by the management system (e.g., by the computing task manager 614).

At 806, sensor data may be received (e.g., from the data processing module 612 of FIG. 6) from the first AV. In some embodiments, the first AV may have collected the sensor data during performance of a data collection task (e.g., collecting sensor data during a delivery task such as delivering and/or picking up one or more items).

At 808, the management system (e.g., the computing task manager 614) may transmit, to the second AV, instructions associated with performing a computing task. In some embodiments, the computing task may comprise retraining the machine-learning model based at least in part on the sensor data received from the first AV.

At 810, the machine-learning model as retrained by the second AV may be obtained (e.g., by the computing task manager 614). In some embodiments, the retrained machine-learning model may be provided by any of the AVs of the computing cluster managed by the cluster manager 618. As another example, the second AV or any suitable AV of the computing cluster may store the retrained machine-learning model in a storage location (e.g., the computing task data store 604) which is accessible to the modules 603 of FIG. 6, and the retrained model may be retrieved from that storage location.

At 812, the machine-learning model as retrained may be transmitted to the set of AVs managed by the management system. In some embodiments, the model may be transmitted to all of the AVs managed by the management system or to some subset (e.g., one or more AVs managed by the management system). In some embodiments, the cluster manager 618 may monitor the status of the set of AVs to identify idle AVs (e.g., AVs that are not actively performing a delivery task and/or a computing task). In some embodiments, the computing task manager 614 may utilize such information to delay transmission of the retrained model (or other suitable data computed by the computing cluster) to those non-idle AVs until a time when those AVs are detected as being in an idle state.

Figure 9:
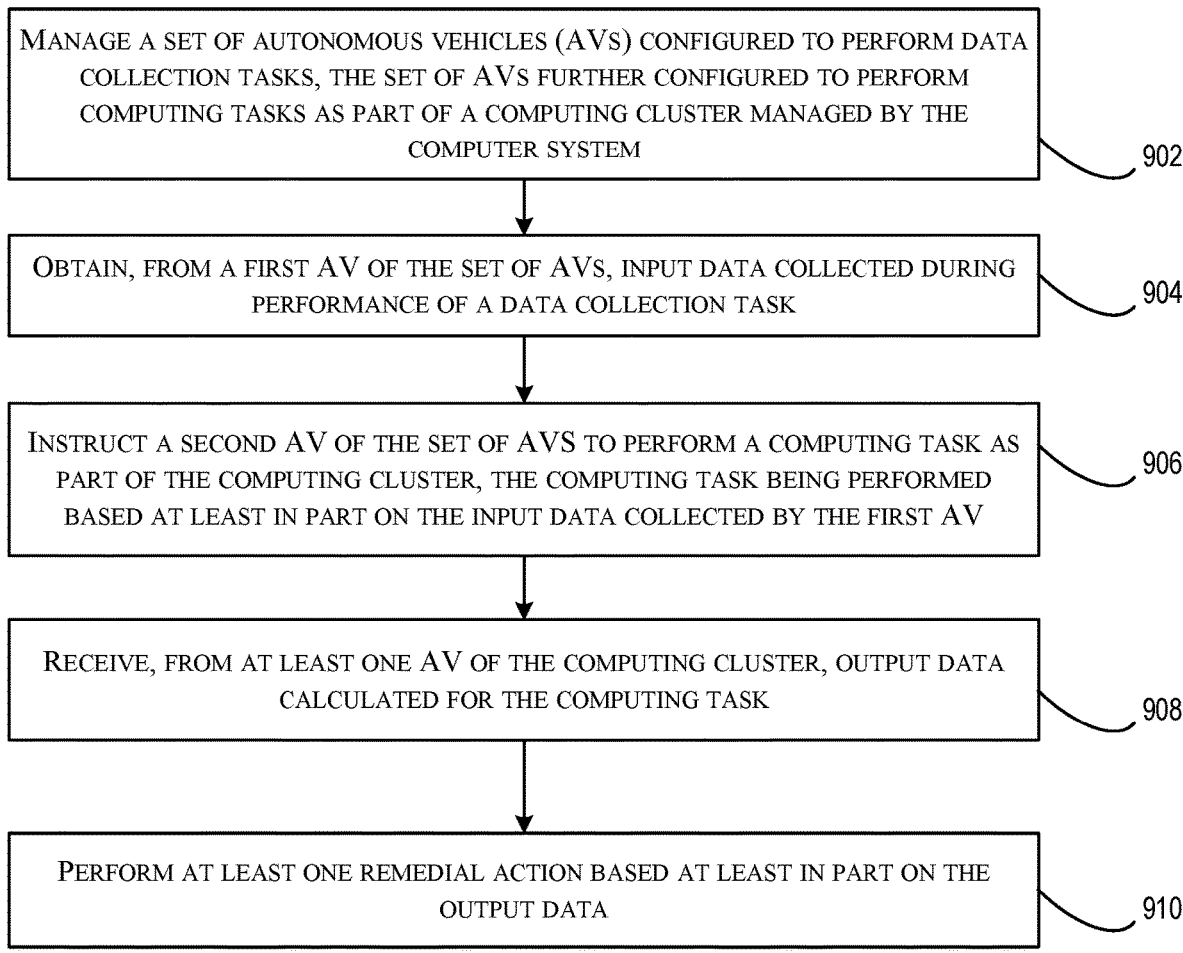
FIG. 9 illustrates yet another example method for training and updating a machine-learning model utilizing the computing management module, in accordance with at least one embodiment.

FIG. 9 illustrates yet another example method 900 for training and updating a machine-learning model utilizing the computing management module (e.g., the computing management module 602 of FIG. 6), in accordance with at least one embodiment. The computing management module may operate on the service provider computer(s) 502 and/or the UAV 504 of FIG. 5 or another suitable one or more non-transitory computer readable media comprising instructions that, when executed with a computer system, cause the computer system to perform the method 900. It should be appreciated that the operations of the method 900 may be performed in any suitable, not necessarily the order depicted in FIG. 9. Further, the method 900 may include additional, or fewer operations than those depicted in FIG. 9.

The method 900 may begin at 902, where a set of autonomous vehicles (AVs) configured to perform data collection tasks and computing tasks may be managed by the computing system (e.g., the system 500, by the computing management module 602, an example of the computing management modules 519 and/or 537, and/or the server management module 536 of FIG. 5). In some embodiments, the server management module 536 may manage data collection task performance and the computing management module 602 may manage computing tasks. In at least one embodiment, the server management module 536 may comprise the computing management module 602. In some embodiments, the set of AVs may be configured to perform computing tasks as part of a computing cluster managed by the computer system. In some embodiments, one or more data collection tasks may be performed during the performance of other tasks (e.g., a delivery task including delivery and/or pickup of an item).

At 904, input data collected during performance of a data collection task may be obtained. In some embodiments, the input data may be obtained from a first AV of the set of AVs. The input data may be collected by the first AV utilizing any suitable onboard sensors and/or through generation by the first AV of any suitable operational data associated with operational parameters of the first AV during performance of the data collection task (and/or a larger task such as a delivery task that includes the data collection task). In some embodiments, the input data may include any suitable combination of data generated and/or obtained by the first AV.

At 906, a second AV of the set of AVS may be instructed (e.g., by the computing task manager 614 of FIG. 6) to perform a computing task as part of the computing cluster. In some embodiments, the computing task may be performed based at least in part on the input data collected by the first AV. As a non-limiting example, the input data may be any suitable sensor data collected at the first AV and the computing task could be training, retraining, or computing an incremental update of a machine-learning model utilizing the input data as described herein above.

At 908, output data calculated for the computing task may be received (e.g., by the computing task manager 614). In some embodiments, the output data may be received from at least in AV of the computing cluster. As a non-limiting example, the output data may be updated parameters for a machine-learning model corresponding to an incremental update of the model based on the sensor data collected by the first AV.

At 910, at least one operations may be performed based at least in part on the output data. By way of example, the output data (e.g., updated parameters for a machine-learning model) may be provided to one or more AVs of the set of AVs according to a predetermined schedule or frequency and/or based on any suitable condition (e.g., determining that a particular AV is not actively performing a delivery, data collection, and/or computing task).

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing system, a training data set comprising historical sensor data associated with a plurality of unmanned aerial vehicles (UAVs);
   managing, by the computing system, a set of UAVs configured to perform tasks as instructed by the computing system, the computing system managing a distributed computing cluster comprising at least two UAVs of the set of UAVs;
   identifying a first subset of UAVs from the set based at least in part on identifying that UAVs of the first subset are in an idle state;
   transmitting, by the computing system to the first subset of UAVs of the distributed computing cluster, instructions associated with training a machine-learning model based at least in part on the training data set;
   receiving, by the computing system, additional sensor data from an unmanned aerial vehicle (UAV) of the set of UAVs;
   transmitting, by the computing system to a second subset of UAVs of the distributed computing cluster, instructions associated with calculating an incremental update to the machine-learning model based at least in part on the additional sensor data;
   receiving, by the computing system, model parameter updates from at least one UAV of the distributed computing cluster;
   updating the machine-learning model based at least in part on the model parameter updates; and
   deploying the machine-learning model as updated to one or more UAVs of the set of UAVs.

2. The computer-implemented method of claim 1, further comprising:
   modifying the training data set to comprise the additional sensor data; and
   transmitting, by the computing system to a second subset of UAVs of the set of UAVs, additional instructions for retraining the machine-learning model based at least in part on the training data set as modified.

3. The computer-implemented method of claim 2, further comprising:
   identifying the second subset of UAVs from the set of UAVs based at least in part on identifying that UAVs of the second subset are in an idle state, wherein the second subset of UAVs differ from the first subset of UAVs.

4. A system, comprising:
   a first autonomous vehicle (AV) comprising a first processor;
   a second AV comprising a second processor; and
   a management system, comprising:
     one or more processors; and
     a non-transitory computer readable media comprising instructions that, when executed with the one or more processors, causes the management system to, at least:
       manage a set of autonomous vehicles (AVs) comprising the first AV and second AV, the management system managing the set of AVs to perform tasks comprising one or more data collection tasks involving collecting sensor data and one or more computing tasks involving performing a set of computations as part of a computing cluster;
       maintain a machine-learning model, the machine-learning model being trained based at least in part on historical sensor data obtained by the management system;
       receive sensor data from the first AV, the first AV having collected the sensor data during performance of a data collection task;
       identify the second AV from the set of AVs based at least in part on identifying that the second AV is in an idle state;
       transmit to the second AV, instructions associated with performing a computing task, the computing task comprising retraining the machine-learning model based at least in part on the sensor data received from the first AV; and
       obtain the machine-learning model as retrained by the second AV; and
       transmit the machine-learning model as retrained to the set of AVs managed by the management system.

5. The system of claim 4, wherein the management system identifies that the second AV is idle prior to transmitting, to the second AV, the instructions associated with performing the computing task, the second AV being identified as idle based at least in part on determining the second AV has no currently assigned data collection task or computing task.

6. The system of claim 4, wherein the management system operates as a master node of the computing cluster, the computing cluster comprising a set of idle AVs identified by the management system.

7. The system of claim 4, wherein the management system is further caused to:
   transmit to at least one idle AV, additional instructions for performing an additional computing task, the additional computing task comprising computing an incremental update to the machine-learning model based at least in part on the sensor data received from the first AV;
   obtain model parameters computed by the at least one idle AV during performance of the incremental update;
   update the machine-learning model based at least in part on the model parameters; and
   transmit the machine-learning model as updated to a portion of the set of AVs managed by the management system.

8. The system of claim 7, wherein the portion of the set of AVs is less than every one of the set of AVs managed by the management system.

9. The system of claim 7, wherein the portion of the set of AVs are identified as having respective data collection tasks in a same area as the data collection task performed by the first AV.

10. The system of claim 7, wherein the management system is further caused to enforce a sequence for two or more incremental updates to the machine-learning model, the two or more incremental updates comprising the incremental update performed by the at least one idle AV.

11. The system of claim 4, wherein the management system is further caused to:
provide a user interface for presenting the sensor data;
receive, via the user interface, user input associated with the sensor data, wherein the instructions for performing the computing task are transmitted to the second AV based at least in part on the user input.

12. The system of claim 4, wherein the management system is further caused to:
provide a user interface for obtaining annotations for the sensor data; and
update the historical sensor data to include the sensor data received from the first AV and the annotations for the sensor data obtained with the user interface.

13. One or more non-transitory computer readable media comprising instructions that, when executed with a computer system, cause the computer system to, at least:
manage a set of autonomous vehicles (AVs) configured to perform data collection tasks, the set of AVs further configured to perform computing tasks as part of a computing cluster managed by the computer system;
obtain, from a first AV of the set of AVs, input data collected during performance of a data collection task;
identify a second AV from a set of AVs based at least in part on identifying that the second AV is in an idle state;
instruct the second AV of the set of AVs to perform a computing task as part of the computing cluster, the computing task being performed based at least in part on the input data collected by the first AV;
receive, from at least one AV of the computing cluster, output data calculated for the computing task; and
perform at least one remedial action based at least in part on the output data.

14. The one or more non-transitory computer readable media of claim 13, wherein the input data is obtained by one or more sensors of the first AV of the set of AVs, the one or more sensors comprising at least one of: a camera, a radar device, a LIDAR device, a sonar device, or a global positioning device.

15. The one or more non-transitory computer readable media of claim 13, wherein the second AV operate as a node of the computing cluster and the computer system coordinates data distribution and computing tasks amongst a plurality of nodes of the computing cluster.

16. The one or more non-transitory computer readable media of claim 13, wherein the computing task relates to retraining or incrementally updating a machine-learning model utilized by the set of AVs during performance of a data collection task, and wherein the second AV is instructed to perform the computing task in accordance with a predetermined schedule.

17. The one or more non-transitory computer readable media of claim 16, wherein the computer system is further caused to, at least:
transmit the machine-learning model as retrained or as updated to at least one AV of the set of AVs;
identify that a particular AV of the set of AVs is performing a data collection task; and
delay transmission of the machine-learning model as retrained or as updated to the AV until the data collection task is complete.

18. The one or more non-transitory computer readable media of claim 13, wherein the computer system is further caused to, at least initialize the computing cluster with the a subset of AVs of the set of AVs based at least in part on identifying that the subset of AVs are in an idle state.

19. The one or more non-transitory computer readable media of claim 13, wherein the input data is provided by the first AV after the first AV has completed performance of a data collection task, the data collection task being performed during a delivery task involving delivery of an item to a predetermined location.

* * * * *